US010911418B1

(12) United States Patent
Fuchs et al.

(10) Patent No.: US 10,911,418 B1
(45) Date of Patent: Feb. 2, 2021

(54) PORT LEVEL POLICY ISOLATION IN OVERLAY NETWORKS

(71) Applicant: Tempered Networks, Inc., Seattle, WA (US)

(72) Inventors: Ludwin Fuchs, Seattle, WA (US); Dustin Orion Lundquist, Vashon, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

(21) Appl. No.: 16/913,114

(22) Filed: Jun. 26, 2020

(51) Int. Cl.
*H04L 29/06* (2006.01)
*H04L 12/715* (2013.01)
*G06F 9/455* (2018.01)
*H04L 12/66* (2006.01)

(52) U.S. Cl.
CPC ...... *H04L 63/0428* (2013.01); *G06F 9/45558* (2013.01); *H04L 12/66* (2013.01); *H04L 45/64* (2013.01); *G06F 2009/45595* (2013.01)

(58) Field of Classification Search
None
See application file for complete search history.

(56) References Cited

U.S. PATENT DOCUMENTS

| 5,835,727 | A | 11/1998 | Wong et al. |
|---|---|---|---|
| 6,981,156 | B1 | 12/2005 | Stern et al. |
| 7,209,956 | B2 | 4/2007 | Mache |
| 7,324,533 | B1 | 1/2008 | DeLiberato et al. |
| 7,373,660 | B1 | 5/2008 | Guichard et al. |
| 7,395,349 | B1 | 7/2008 | Szabo et al. |
| 7,796,593 | B1 | 9/2010 | Ghosh et al. |
| 7,881,199 | B2 | 2/2011 | Krstulich |
| 7,996,894 | B1 | 8/2011 | Chen et al. |

(Continued)

FOREIGN PATENT DOCUMENTS

| WO | 2007038872 A1 | 4/2007 |
|---|---|---|
| WO | 2008039506 A2 | 4/2008 |

OTHER PUBLICATIONS

Asguard Networks, Inc., "SimpleConnectTM Product Information," Retrieved on Nov. 9, 2012, from http://www.asguardnetworks.com/product, 1 page.

(Continued)

*Primary Examiner* — Joseph P Hirl
*Assistant Examiner* — Hassan Saadoun
(74) *Attorney, Agent, or Firm* — John W. Branch; Branch Partners PLLC

(57) ABSTRACT

Embodiments are directed to managing communication over one or more networks. An underlay network that couples a source gateway and a target gateway using underlay protocols may be provided such that the target gateway includes two or more port groups that may each be associated with a separate target node. An overlay network may be provided on the underlay network based on policy information such that the source gateway and the target gateway may each be assigned separate gateway identifiers (GIDs) that are associated with the overlay network. In response to the source gateway authorizing a source node to employ the overlay network to communicate one or more encrypted payloads to a target node, the one or more encrypted payloads may be provided to the target node based on the overlay network and the policy information.

24 Claims, 14 Drawing Sheets

(56) References Cited

U.S. PATENT DOCUMENTS

| | | | |
|---|---|---|---|
| 8,224,971 B1 | 7/2012 | Miller et al. | |
| 8,429,400 B2 | 4/2013 | Khalid et al. | |
| 8,489,701 B2 | 7/2013 | Manion et al. | |
| 8,607,301 B2 | 12/2013 | Carrasco | |
| 8,630,183 B2 | 1/2014 | Miyata | |
| 8,832,211 B1 | 9/2014 | Lebedev et al. | |
| 8,886,827 B2 | 11/2014 | Goel et al. | |
| 8,959,513 B1 | 2/2015 | Swaminathan | |
| 9,264,522 B1 | 2/2016 | Reeves et al. | |
| 10,158,545 B1* | 12/2018 | Marrone | H04L 12/66 |
| 2002/0026532 A1 | 2/2002 | Maeda et al. | |
| 2002/0073182 A1 | 6/2002 | Zakurdaev et al. | |
| 2002/0143855 A1 | 10/2002 | Traversat et al. | |
| 2003/0061479 A1 | 3/2003 | Kimura | |
| 2003/0081620 A1 | 5/2003 | Danner et al. | |
| 2003/0123436 A1 | 7/2003 | Joseph et al. | |
| 2004/0024905 A1* | 2/2004 | Liao | H04L 29/06 709/239 |
| 2004/0143628 A1 | 7/2004 | Bradford et al. | |
| 2004/0268121 A1 | 12/2004 | Shelest et al. | |
| 2005/0014500 A1 | 1/2005 | Muhonen et al. | |
| 2005/0052999 A1 | 3/2005 | Oliver et al. | |
| 2005/0265355 A1 | 12/2005 | Havala et al. | |
| 2006/0190458 A1 | 8/2006 | Mishina et al. | |
| 2007/0019641 A1 | 1/2007 | Pai et al. | |
| 2007/0081530 A1 | 4/2007 | Nomura et al. | |
| 2007/0226781 A1 | 9/2007 | Chen et al. | |
| 2007/0230352 A1 | 10/2007 | Kokku et al. | |
| 2007/0258440 A1 | 11/2007 | Watanabe | |
| 2008/0072282 A1 | 3/2008 | Willis et al. | |
| 2008/0082823 A1 | 4/2008 | Starrett et al. | |
| 2008/0151916 A1 | 6/2008 | Jetcheva et al. | |
| 2008/0232360 A1 | 9/2008 | Mihaly et al. | |
| 2008/0288614 A1 | 11/2008 | Gil et al. | |
| 2008/0307519 A1 | 12/2008 | Curcio et al. | |
| 2009/0010168 A1 | 1/2009 | Yurchenko et al. | |
| 2009/0034738 A1 | 2/2009 | Starrett | |
| 2009/0059906 A1 | 3/2009 | Cullen | |
| 2009/0129374 A1 | 5/2009 | Yurchenko et al. | |
| 2009/0210518 A1 | 8/2009 | Verma et al. | |
| 2009/0310518 A1 | 12/2009 | Jayaram et al. | |
| 2010/0014533 A1 | 1/2010 | Hirano et al. | |
| 2010/0024026 A1 | 1/2010 | Ylonen et al. | |
| 2010/0027442 A1 | 2/2010 | Chockler et al. | |
| 2010/0042747 A1 | 2/2010 | Hascalovici et al. | |
| 2010/0214959 A1 | 8/2010 | Kuehnel et al. | |
| 2010/0218235 A1 | 8/2010 | Ganot | |
| 2010/0254395 A1 | 10/2010 | Smith et al. | |
| 2011/0016509 A1 | 1/2011 | Huang et al. | |
| 2011/0035466 A1 | 2/2011 | Panigrahi | |
| 2011/0090892 A1 | 4/2011 | Cooke | |
| 2011/0103393 A1 | 5/2011 | Meier et al. | |
| 2011/0141881 A1 | 6/2011 | Joshi et al. | |
| 2012/0110203 A1 | 5/2012 | Ozawa | |
| 2012/0163196 A1 | 6/2012 | Jansen et al. | |
| 2012/0304243 A1 | 11/2012 | Li et al. | |
| 2013/0018993 A1 | 1/2013 | Hui et al. | |
| 2013/0083725 A1 | 4/2013 | Mallya et al. | |
| 2013/0198830 A1 | 8/2013 | Nemoto et al. | |
| 2013/0254264 A1 | 9/2013 | Hankinson et al. | |
| 2013/0283364 A1 | 10/2013 | Chang et al. | |
| 2014/0026207 A1 | 1/2014 | Wang et al. | |
| 2014/0133354 A1 | 5/2014 | Scharf et al. | |
| 2014/0150070 A1 | 5/2014 | Peterson | |
| 2014/0223507 A1 | 8/2014 | Xu | |
| 2014/0282817 A1 | 9/2014 | Singer et al. | |
| 2014/0282850 A1 | 9/2014 | Mattes et al. | |
| 2014/0307744 A1 | 10/2014 | Dunbar et al. | |
| 2014/0348131 A1 | 11/2014 | Duan et al. | |
| 2015/0024677 A1 | 1/2015 | Gopal et al. | |
| 2015/0046997 A1 | 2/2015 | Gupta et al. | |
| 2015/0057766 A1 | 2/2015 | Ejiri et al. | |
| 2015/0067033 A1 | 3/2015 | Martinsen et al. | |
| 2015/0124823 A1 | 5/2015 | Pani et al. | |
| 2015/0135259 A1 | 5/2015 | Ilyadis et al. | |
| 2015/0281074 A1 | 10/2015 | Kubota | |
| 2015/0365316 A1 | 12/2015 | Liao et al. | |
| 2015/0372828 A1 | 12/2015 | Hao et al. | |
| 2016/0028624 A1 | 1/2016 | Song et al. | |
| 2016/0036861 A1 | 2/2016 | Mattes et al. | |
| 2016/0149804 A1 | 5/2016 | Mirza | |
| 2016/0261641 A1 | 9/2016 | Mattes et al. | |
| 2017/0238215 A1 | 8/2017 | Jin | |
| 2018/0083968 A1 | 3/2018 | Xu et al. | |
| 2019/0149401 A1* | 5/2019 | Ramachandran | H04L 61/15 709/220 |
| 2019/0394107 A1 | 12/2019 | Marrone et al. | |

OTHER PUBLICATIONS

Asguard Networks, Inc., "Welcome to Asguard Networks," Retrieved on Oct. 23, 2012, from http://www.asguardnetworks.com/, 1 page.

Asguard Networks, Inc., "SimpleConnectTM Quick Start Documentation Guide," Revision 1, Dec. 13, 2012, pp. 1-18.

Henderson, T. et al., "HIP-based Virtual Private LAN Service (HIPLS)," Network Working Group, Internet-Draft, The Boeing Company, Nov. 6, 2012, pp. 1-16.

International Search Report and Written Opinion for International Patent Application No. PCT/US2014/023632 dated Jun. 23, 2014, pp. 1-15.

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news, pp. 1-2.

Trusted Computing Group, Incorporated, "TCG Trusted Network Connect: IF-MAP Metadata for ICS Security," Specification Version 1.0, Revision 44, May 8, 2014, pp. 1-64.

Office Communication for U.S. Appl. No. 14/740,053 dated Jul. 29, 2015, pp. 1-10.

Office Communication for U.S. Appl. No. 14/204,907 dated Jul. 10, 2015, pp. 1-20.

Aoyagi, S. et al., "ELA: A Fully Distributed VPN System Over Peer-to-Peer Network," Proceedings of the 2005 Symposium on Applications and the Internet, 2005, IEEE, Computer Society; pp. 1-4.

Benyamina, D. et al., "Wireless Mesh Networks Design—A Survey," IEEE Communications Survey & Tutorials, vol. 14, No. 2, Second Quarter 2012, pp. 299-310.

International Search Report and Written Opinion for International Patent Application No. PCT/US2015/042993 dated Nov. 11, 2015, pp. 1-11.

Office Communication for U.S. Appl. No. 14/204,907 dated Dec. 2, 2015, pp. 1-14.

Official Communication for U.S. Appl. No. 15/156,254 dated Aug. 3, 2016, pp. 1-13.

Trusted Computing Group Architects Guide; ICS Security Using TNC Technology, Oct. 2013, pp. 1-6.

Official Communication for U.S. Appl. No. 15/083,214 dated Oct. 25, 2016, pp. 1-11.

Office Communication for U.S. Appl. No. 14/740,053 dated Jan. 21, 2016, pp. 1-18.

Office Communication for U.S. Appl. No. 14/204,907 dated Feb. 24, 2016, pp. 1-20.

Official Communication for U.S. Appl. 15/083,214 dated Jul. 7, 2016, pp. 1-11.

Official Communication for U.S. Appl. No. 15/201,063 dated Nov. 2, 2016, pp. 1-11.

Official Communication for U.S. Appl. No. 15/156,254 dated Dec. 30, 2016, pp. 1-13.

Official Communication for U.S. Appl. No. 15/083,214 dated Jan. 9, 2017, pp. 1-5.

Official Communication for U.S. Appl. No. 15/156,254 dated May 5, 2017, pp. 1-13.

Official Communication for U.S. Appl. No. 15/083,214 dated Feb. 9, 2017, pp. 1-10.

Official Communication for U.S. Appl No. 14/814,283 dated Jun. 9, 2017, pp. 1-18.

(56) References Cited

OTHER PUBLICATIONS

Official Communication for U.S. Appl. No. 15/201,063 dated Apr. 21, 2017, pp. 1-14.
Official Communication for U.S. Appl. No. 14/814,283 dated Nov. 30, 2015, pp. 1-8.
Official Communication for U.S. Appl. No. 14/814,283 dated Jun. 3, 2016, pp. 1-10.
Official Communication for U.S. Appl. No. 14/814,283 dated Aug. 23, 2016, pp. 1-7.
Official Communication for U.S. Appl. No. 14/814,283 dated Nov. 21, 2016, pp. 1-10.
Official Communication for U.S. Appl. No. 15/156,254 dated Oct. 19, 2017, pp. 1-13.
Lawton, "Machine-to-Machine Technology gears up for growth", 2004, pp. 12-15, IEEE Computer Society, pp. 1-4.
Official Communication for U.S. Appl. No. 15/670,925 dated Apr. 5, 2018, pp. 1-10.
Official Communication for U.S. Appl. No. 15/156,254 dated May 14, 2018, pp. 1-17.
Official Communication for U.S. Appl. No. 15/670,859 dated Jun. 29, 2018, pp. 1-29.
Official Communication for U.S. Appl. No. 15/924,148 dated Jun. 5, 2018, pp. 1-24.
Official Communication for U.S. Appl. No. 15/987,762 dated Sep. 12, 2018, pp. 1-24.
Official Communication for U.S. Appl. No. 15/670,859 dated Nov. 26, 2018, pp. 1-20.
Official Communication for U.S. Appl. No. 15/994,760 dated Oct. 1, 2018, pp. 1-22.
Official Communication for U.S. Appl. No. 16/267,166 dated Jan. 14, 2020, pp. 1-5.
Official Communication for U.S. Appl. No. 16/172,621 dated Mar. 17, 2020, pp. 1-7.
Official Communication for U.S. Appl. No. 16/221,145 dated Apr. 13, 2020, pp. 1-7.
Official Communication for U.S. Appl. No. 16/172,621 dated Jul. 15, 2020, pp. 1-14.
Official Communication for U.S. Appl. No. 16/267,166 dated Jul. 22, 2020, pp. 1-8.
Office Communication for U.S. Appl. No. 16/562,258 dated Oct. 22, 2019, pp. 1-10.
Official Communication for U.S. Appl. No. 16/562,258 dated Apr. 7, 2020, pp. 1-10.
Official Communication for U.S. Appl. No. 15/083,214 dated Jul. 7, 2016, pp. 1-11.

* cited by examiner

PORT LEVEL POLICY ISOLATION IN OVERLAY NETWORKS

TECHNICAL FIELD

The present invention relates generally to network management, and more particularly, but not exclusively, to managing communication over a network in which host identity is distinct from its topological location on a network.

BACKGROUND

Typical network communication protocols, such as, Internet Protocol (IP) deliver network packets from a source host to a destination host based on an IP address. Traditionally, IP addresses have served a dual purpose as a host's identity and location. This has led to challenges securing the various hosts and networks in modern distributed networking environments. For instance, network packets often include a source network address that may be used by the target host to address and route return packets. However, in some cases target hosts may use the source network address to determine the identity of the source host. In some cases, this dual use may cause networks or services to be vulnerable to man-in-the-middle attacks based on network packets that include false or spoofed network addresses. Other security challenges enabled in part by this dual role of network addresses may include denial of service attacks, replay attacks, or the like. Also, since modern computing environments often employ ephemeral and/or non-unique network addresses, using network address to provide host identity poses challenges, as modern hosts, e.g. cell phones, frequently change location on the network. In some cases, overlay networks may be employed to layer a logical network (the overlay network) on conventional underlay networks. While the overlay network can provide additional security or flexibility, the work of actually moving the network traffic from one endpoint to another requires the underlay network and one or more underlay network protocols. Accordingly, overlay networks may be required to integrate with one or more underlay network address schemes to enable network traffic to be exchanged among endpoints on the overlay network. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
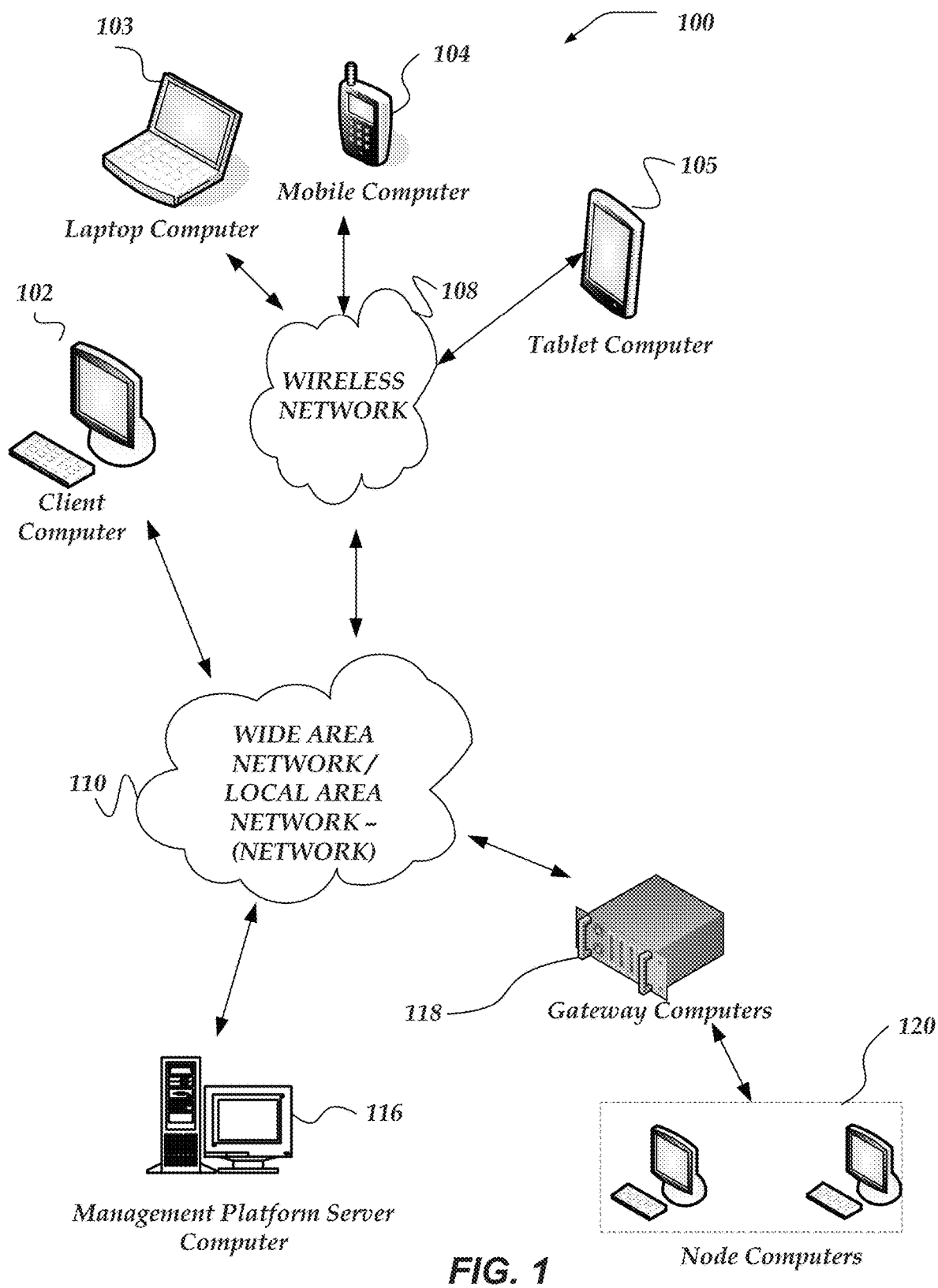
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment, an embodiment combining software and hardware aspects, or one or more components of hardware or software. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "overlay network," "mesh network," "industrial network" refer to a network of industrial computer/machines, workstations, client computers, gateway computers, or the like. The term mesh network used herein describes both the typical network topology of a network in an industrial operation environment as well as more generally, a networked system used to perform operations in an industrial environment, such as, as factory floor, manufacturing complex, oil refinery, or the like. Also, in some cases, overlay or mesh networks may be employed in mobile applications, including vehicle (e.g., automobiles, marine vehicles, aircraft, spacecraft, or the like) based networks, or the like. In the interest of clarity such networks (including machines and computers on the network) are referred to as overlay networks even when their topology or configuration is not strictly a mesh network or partial mesh network.

As used herein the term "physical network" refers to the actual communication network that interconnects one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network Also, physical networks may be considered to include the native communication protocols, network topology, and so on, that may be used to setup an overlay network in an various environments. In some cases, physical networks may be arranged to enable open communication between node computers, (e.g., machines, workstations, client computers, and so on), gateway computers, management platform computers, relay computers, or the like, that are on the physical network.

As used herein the terms "node," and "node computer" refer to computers that are endpoint computers interconnected over a physical network. Node computers may include client computers, smart phones, video cameras, sensors, network computers, industrial workstations, press machines, robots, packaging machines, automated milling machines, automated printing presses, pumps, valves, boilers, or the like. Node computers are considered to be computers or devices connected to the physical network exclusive of gateway computers, relay computers, management platform server computers, or the like. Nodes gain access to the networks managed management platform via gateway computers As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/overlay network. These intended recipients of these communication may be considered target node computers. Accordingly, a node computer may be a target node computer if it receives communications and it may be a source node computer if it sends communications.

As used herein the terms "gateway," or "gateway computer" refer to computers connected to a network that are disposed between the node computers and the physical network. Gateway computers may be network computers that may be arranged to provide security, access control, communication routing, or the like, for overlay networks or mesh networks. In some embodiments, gateway computers may be configured by another network computer, such as, a management platform computer.

As used herein the term "relay computer", or "relay" refer to one or more computers that serve as intermediaries for establishing connections between gateway computers that may be on different networks. In some cases, relay computers may be associated with network addresses that may be reached from more than one network.

As used herein the term "network address" refers to a value or values used for locating an endpoint in a network. In some embodiments, endpoints may include services, networks, network computers, client computers, applications, firewall, router, load balancers, node computers, gateway computers, relay computers, management platform computers, or the like. A network address may be assumed to comprise one or more identifiers that may be recognized by one or more protocols.

As used herein the term "device address" refers to an identifier that may be associated with a network interface. Device addresses may be employed by low level network protocols to communicate network traffic from one network interface to another. Accordingly, devices addresses may be used to send network traffic from one device to another device that are in the same physical network segment. The particular makeup or format of a device address may vary depending on the network protocol being employed. For example, MAC addresses may be used to identify devices in Ethernet networks, Wifi networks, or Bluetooth networks. Device addresses may be unsuitable for communicating between devices on different networks or different network segments for various reasons including an absence of routing information, security information, or network topology information.

As used herein the term "protocol address" refers to an endpoint identifier that may be associated with devices or interfaces. Protocol addresses may be used to send network packets to other interfaces in the same network segment or to interfaces in other network segments depending on the network protocol and network policies/configuration. Protocol address generally embed information that may be employed to determine a communication path across one or more devices to reach a target or destination device. For example, IP addresses may be considered protocol addresses because devices on different networks that support the IP protocol may communicate with devices on the same network or different network. Protocol addresses assume that a network stack, network devices, or network engines may be enabled to associate protocol addresses with device addresses. This enables the lower level interface-to-interface communication to determine which interface receives the network traffic without knowledge of the higher level transport protocols that may be operative in a network. In some cases, if an interface is trying to reach another interface in a different network segment, it usually steps up to a higher level protocol that can negotiate the traversal across the network segments. Also, in some networking environments, one or more services may be provided that enable the discovery of which device address to employ to reach an interface associated with a given protocol address. In some cases, there may be one or more intervening networks that require traversal before the network that includes a target interface may be reached. Accordingly, routing services may provide device addresses that represent a 'next hop' on a path to the target device.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over one or more networks. In one or more of the various embodiments, an underlay network that communicatively couples a source gateway and a target gateway using one or more underlay protocols may be provided such that the target gateway includes two or more port groups that may each be associated with a separate target node.

In one or more of the various embodiments, an overlay network may be provided on one or more underlay networks based on policy information such that the source gateway and the target gateway may each be assigned separate gateway identifiers (GIDs) that are associated with the overlay network. In one or more of the various embodiments, providing the overlay network may include enabling encrypted payloads to be exchanged between one or more source nodes associated with the source gateway and the two or more target nodes using an overlay protocol that may be separate from the one or more underlay protocols.

In one or more of the various embodiments, in response to the source gateway authorizing a source node to employ the overlay network to communicate one or more encrypted payloads to a target node, performing further actions, including:

in one or more of the various embodiments, a virtual device address for the target gateway may be provided to the source gateway such that the virtual device address may be based on the GID assigned to the target gateway, and such that the virtual device address may be employed as a device address of the target gateway on the underlay network. In one or more of the various embodiments, providing the virtual device address for the target gateway may include: employing the underlay network to request a device address of the target gateway based on a protocol address that corresponds to the target gateway, wherein the protocol address of the target gateway is based on the GID assigned to the target gateway; determining the virtual device address of the target gateway based on the protocol address associated with the target gateway; and employing the one or more underlay protocols to communicate the virtual device address to the source gateway;

in one or more of the various embodiments, the underlay network and the virtual device address may be employed to communicate network traffic from the source node to the target gateway such that the network traffic includes a protocol address of the target node and the one or more encrypted payloads;

in one or more of the various embodiments, a device address of a port group on the target gateway associated with the target node may be determined based on the protocol address of the target node and the policy information; and in one or more of the various embodiments, the device address of the port group may be employed to provide the one or more encrypted payloads to the target node, wherein each encrypted payload is decrypted by the target node.

In one or more of the various embodiments, the policy information may be provided to the target gateway and the source gateway by a management platform engine. In one or more of the various embodiments, one or more access rules that enable the source node to provide network traffic to the target node over the overlay network may be determined based on the policy information. In some embodiments, the target node may be associated with the port group on the target gateway based on the policy information.

In one or more of the various embodiments, the underlay network may be employed to provide a device address of the source gateway to the source node. And, in some embodiments, the underlay network and the device address of the source gateway may be employed to communicate the one or more encrypted packets to the source gateway.

In one or more of the various embodiments, the underlay network may be employed to communicate one or more other encrypted packets from the source node to another target node such that the other target node may be associated with another port group on the source gateway and such that the other port group may be separate from a port group associated with the source node. In some embodiments, another device address of the other port group may be determined based on another protocol address associated with the other target node. And, in one or more of the various embodiments, the underlay network and the other device address of the other port group may be employed to communicate the one or more other encrypted packets from the source gateway to the other target via the other port group.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, management platform server computer 116, gateway computers 118, node computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like.

For example, client computers 102-105 may be configured to operate as a web server, client application, media player, mobile telephone, game console, desktop computer, or the like. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 120 represent one or more client computer, network computer, or network devices, or the like, that may be arranged to access networks via a gateway computer. Each node computer may be associated with a gateway computer that enable network access to other node computers, gateway computers, or the like. Node computers 120 may be arranged to communicate with their associate gateway computer. Accordingly, in some embodiments, their gateway computer may route the node computer communication according to policy provided by a management platform server, such as, management platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include overlay networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, management platform server computer 116, gateway computers 118, node computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates management platform server computer 116, gateway computers 118, node computers 120 each as a single computer, the innovations or embodiments are not so limited. For example, one or more functions of management platform server computer 116, gateway computers 118, node computers 120 or the like, may be distributed across one or more distinct network computers. Moreover, management platform server computer 116, gateway computers 118, node computers 120 are not limited to a particular configuration such as the one shown in FIG. 1. Thus, in one or more embodiments, management platform server computer 116, gateway computers 118, node computers 120 may be implemented using a plurality of network computers. In other embodiments, management platform server computer 116, gateway computers 118, node computers 120 may operate as a plurality of network computers within a cluster architecture, a peer-to-peer architecture, or the like. Also, in some embodiments, one or more processors on one or more network computers may be arranged to perform one or more actions of management platform server computer 116, gateway computers 118, node computers 120, or the like. Further, in at least one of the various embodiments, management platform server computer 116, gateway computers 118, node computers 120 may be implemented using one or more cloud instances in one or more cloud computing environments. Likewise, in at least one of the various embodiments, management platform server computer 116, gateway computers 118, node computers 120 may be implemented using one or more container instances in one or more container computers environments.

Illustrative Client Computer

Figure 2:
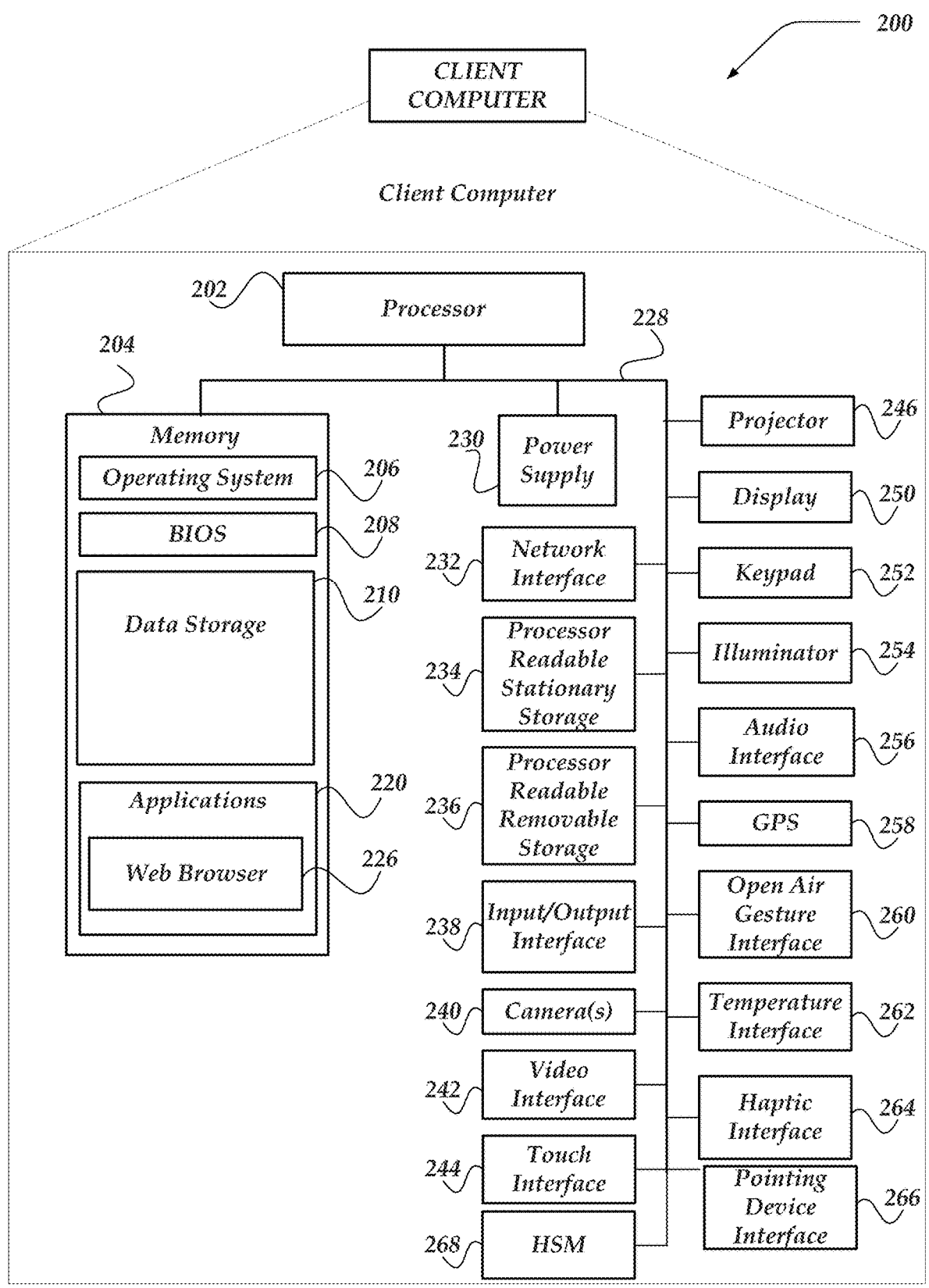
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers 102-105 shown in FIG. 1. Also, in some embodiments, one or more node computers, such as, node computers 120 may be client computers.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. Web browser 226 may be used to configure overlay routes via management platform server computer 116, as discussed below in conjunction with FIG. 3. For example, a user may operate web browser application 226 in order to configure one or more port level policies or port isolation policies for one or more node computers or gateway computers.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, web browser 226. Other examples of application programs include calendars, search programs, email client applications, IM applications, SMS applications, Voice Over Internet Protocol (VoIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
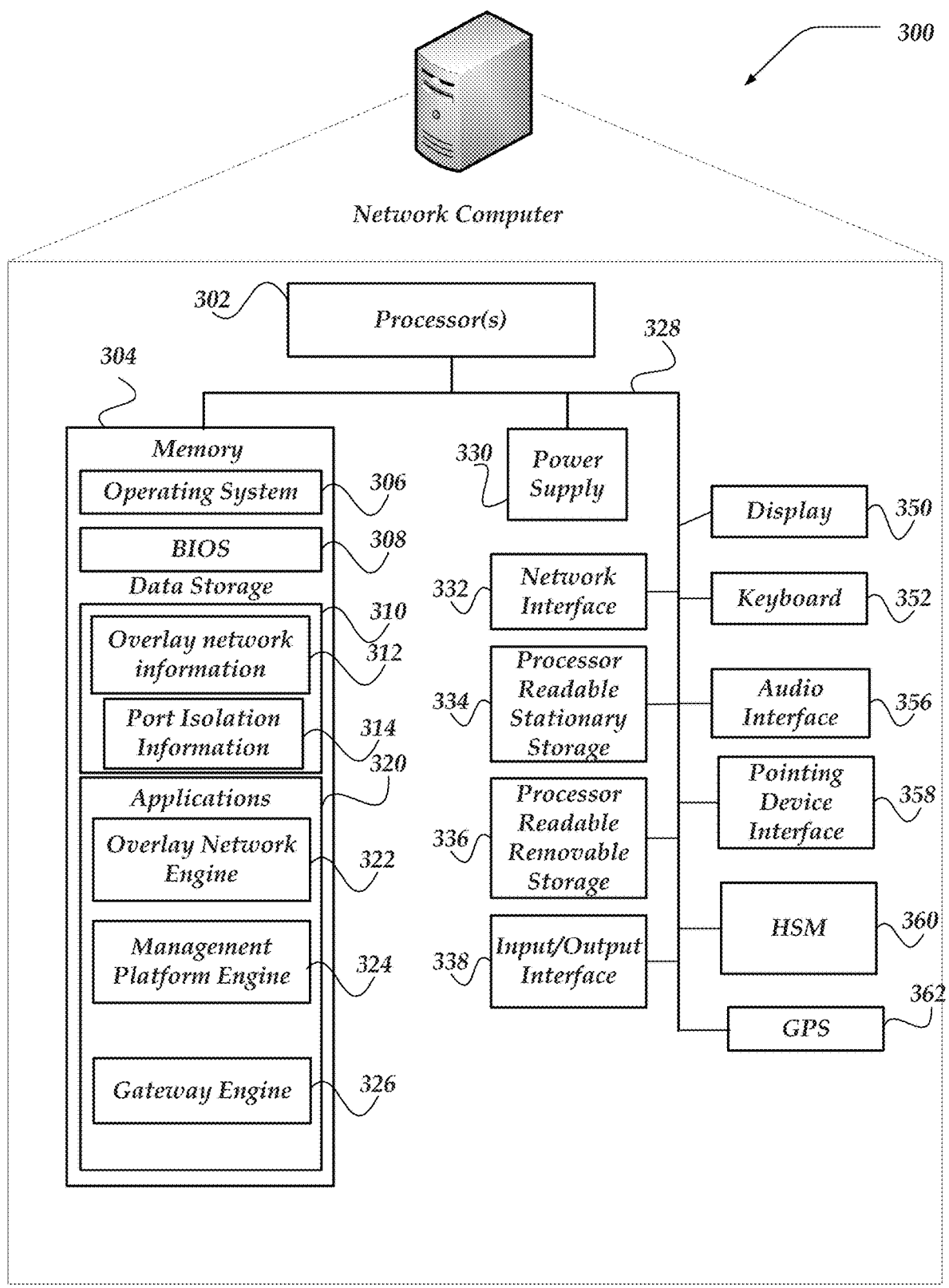
FIG. 3 illustrates a schematic embodiment of a network computer.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of one or more of management platform server computer 116, gateway computers 118, or one or more node computers 120 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux, or a specialized operating system such as Microsoft Corporation's Windows® operating system, or the Apple Corporation's iOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Data storage 310 may include, for example, overlay network information 312, port isolation information 314, or the like. Overlay network information 312 may contain policy data defining which gateways or node computers are allowed to communicate with each other as well as the physical network routes that may be available. In one embodiment, overlay network information 312 may be generated and stored on management platform servers, such as, management platform server computer 116 before being distributed to gateway computers 118. Data storage 310 may also include port isolation information 314 that may include information for managing port level policies at gateway computers.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network engine 322, management platform engine 324, or gateway engine 326 which may be enabled to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 306, overlay network engine 322, management platform engine 324, gateway engine 326, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes or databases. In at least one of the various embodiments, geo-location information used for selecting localization information may be provided by GPS 362. Also, in some embodiments, geolocation information may include information provided using one or more geolocation protocols over the networks, such as, wireless network 108 or network 110.

Furthermore, in at least one of the various embodiments, overlay network engine 322, management platform engine 324, gateway engine 326, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to overlay network engine 322, management platform engine 324, gateway engine 326, or the like, may be provisioned and de-commissioned automatically. Also, in at least one of the various embodiments, overlay network information 312, port isolation information 314, or the like, may located in virtual servers running in a cloud-based computing environment rather than being tied to one or more specific physical network computers. In some embodiments, various applications, data storage, or the like, may be operative in one or more container computers executing in a container computing environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Logical System Architecture

Figure 4:
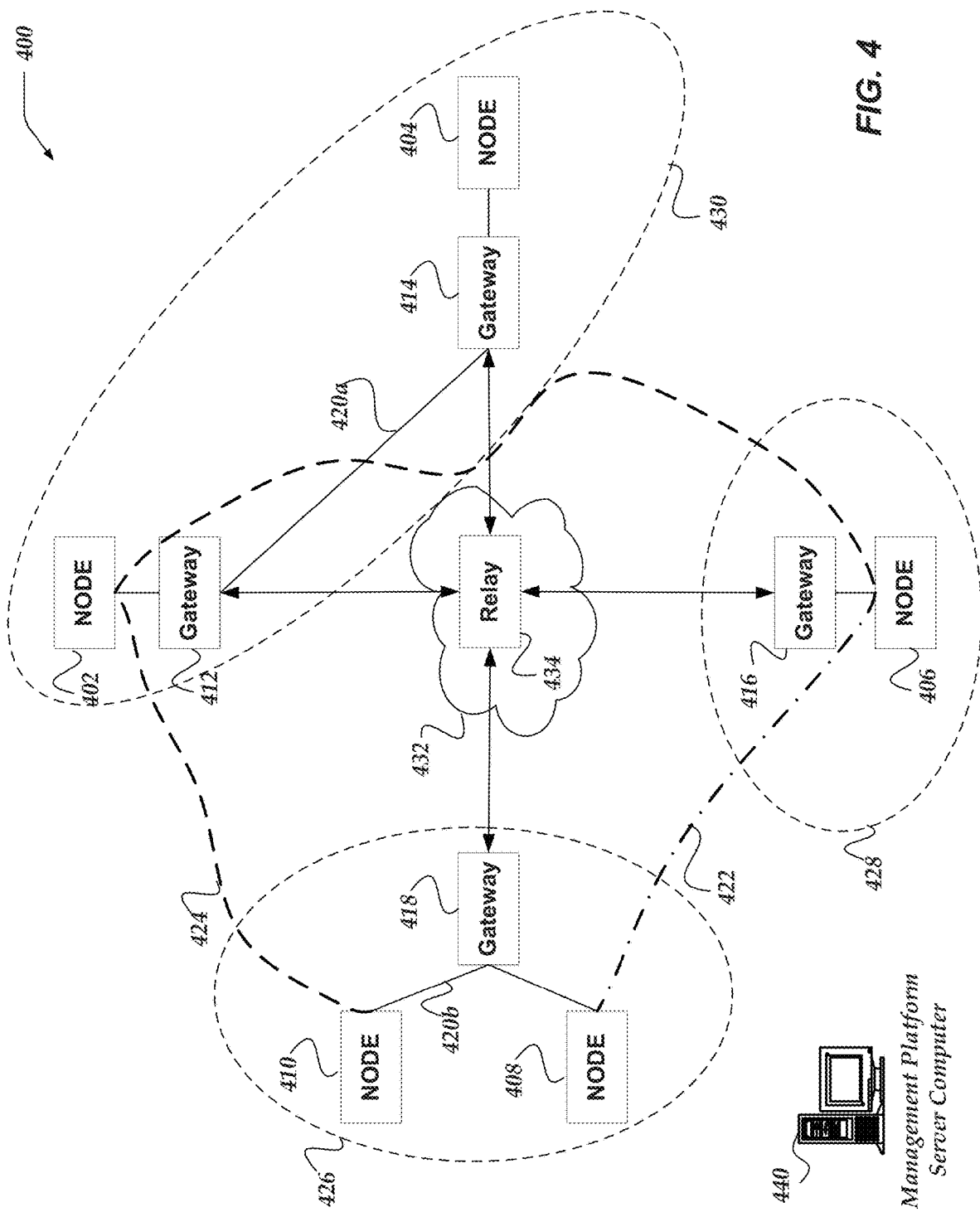
FIG. 4 illustrates a logical schematic of a network that includes overlay networks, node computers, gateway computers, relay computers, or the like, in accordance with at least one of the various embodiments.

FIG. 4 illustrates a logical schematic of network 400 that includes overlay networks, node computers, gateway computers, relay computers, or the like, in accordance with at least one of the various embodiments. Network 400 is arranged to include gateway computers, such as, gateway computers 412-418. Gateway computers may be disposed between one or more node computers and the underlying physical network infrastructure. In at least one of the various embodiments, the gateway computers may be arranged such that they isolate node computers, such as, node computers 402-410 from the physical network used to interconnect them. Also, in this example, management platform server computer 440 represents one or more management platform servers that may be assumed to be arranged to communicate over one or more networks with relay computers and gateway computers that comprise network 400. In one or more of the various embodiments, among other things, management platform server 440 may be arranged to manage the configuration or distribution of policy information.

In this example, physical networks, such as, physical network 420a, physical network 420b, a public network 432 provide an underlying physical network comprising network 400. In this example, node computer 404 is isolated from physical network 420a by gateway computer 414.

Also, in one or more of the various embodiments, private networks, such as, private network 426, private network 428, or private network 430 may represent separate or isolated networks that may be configured to prevent computers them from being visible or directly accessible from outside each of the private networks.

In some embodiments, gateway computers may be arranged to communicate with one or more relay computers, such as, relay computer 434 via another network, such as, network 432. In some embodiments, relay computer 434 may be arranged to have a network address that may be visible from computers that may be part of other networks, including private networks, such as, private network 420a and private network 420b, or the like.

Accordingly, in at least one of the various embodiments, the gateway computers may be configured to provide or enforce one or more overlay networks in network 400. In this example, for some embodiments, overlay network 422 enables node computer 406 and node computer 408 to "see" each other on the network; communication from node computer 406 to node computer 408 may be routed through gateway computer 416 to network 432 to relay 434 to gateway computer 418; and the communication may then be routed from gateway computer 418 to node 408 over private network 420b. From the point-of-view of node computer 406 and node computer 408 the communication appears to go directly over overlay network 422. In actuality the communication will be routed from node 406 to gateway computer 416 to relay 432 to gateway computer 418.

Likewise, in this example, network 400 may be arranged such that node computer 402, node computer 406, and node computer 410 communicate over overlay network 424. As described above, in at least one of the various embodiments, the communication among/between the nodes on overlay network 424 may be routed through relay 434 and two or more of the gateway computers.

In at least one of the various embodiments, the gateway computers may be configured with one or more rule-based policies that determine access or restrictions for network communication on the networks. The particular rules or restrictions associated with how communication information (e.g., network packets) should be routed through the overlay network may be established by a management platform computer, such as management platform server computer 440, or the like. Configuration information may be pushed (e.g., router tables, or the like) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. Accordingly, if a node computer, such as, node computer 410 is in gateway computer 418's list of allowed computers (e.g., a whitelist) it may be enabled to initiate communication over the overlay network through gateway computer 418. Conversely, node computers, or any other computer for that matter, not in a gateway computer's whitelist may be denied access to that gateway computer and the overlay networks. Though, in some embodiments, a node computer may be allowed to access one or more particular gateway computers and denied accessed to others. In at least one of the various embodiments, a management platform computer, such as, management platform server computer 440, may be arranged to manage and distribute the whitelists to the one or more gateway computers.

In at least one of the various embodiments, by placing gateway computers between physical networks (e.g., private network 420a or private network 420b) and the node computers, the configuration or definition of one or more overlay networks may be accomplished without requiring the individual node computers to be reconfigured. Further, in at least one of the various embodiments, gateway computers may comprise security hardened computers that provide various routing, security or cryptography features to help secure the one or more networks. Otherwise, in at least one of the various embodiments, the network may be reliant on the security features of the node computers themselves which may be non-existent or very limited.

In some embodiments, gateway computers may include multiple gateway links each providing access to one or more networks. In one or more of the various embodiments, gateway links may be arranged to provide secure or redundant access to one or more networks. In some embodiments, one or more gateway links may have access to one or more networks not available or accessible to some or all of the other gateway links.

In at least one of the various embodiments, overlay networks may be enforced by using one or more overlay whitelists that define the endpoints (e.g., node computer, gateway computers, relays computers, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, management platform computer 440 may be arranged to manage and distribute the overlay whitelists to each gateway computer comprising an overlay network.

In some embodiments, computers in different networks may be unable to identify or access each other because their local networks are using separate (perhaps conflicting) network address namespaces. For example, gateway computer 418, and consequently, node computers 408 and 410, cannot be accessed from outside of the private network 420*b* without gateway computer 418 first initiating a connection outside of private network 420*b*. This may be true even if a public network address associated with private network 420*b* is known because the network address of node computers in private networks, such as, private network 420*b* are not generally available to computers outside of the same private networks.

In some embodiments, relay computers, such as relay computer 434, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can see the other, because they are both located in separate private networks, one or more relay computers, such as, relay computer 434 may be employed to bridge the networks to enable node computers in one network to reach node computers in another network.

In one or more of the various embodiments, while in some cases, gateway computers may be stationary on a network, in that they maintain the same network address indefinitely, the network address for a gateway computer may change from time to time. For example, a gateway computer may be moved to a different location, e.g. to another building on a corporate campus that is associated with a different range of network addresses. Similarly, a gateway that is a mobile device such as a smart phone may pass between cell towers or access points, each of which may be associated with a different network addresses. In one or more of the various embodiments, gateway computers may also experience a change in network address if the network changes, e.g. if a new internet service provider (ISP) is introduced. However it happens, if a network address associated with a gateway computer changes, any existing connections using that network address will be dropped. However, because identity based networking does not rely on a host's location as identity, the connection can be seamlessly re-established if management platform server 440 discovers the change and broadcasts the new network address for the gateway computer. For example, if gateway computer 416 determines that its network address has changed, it will notify its associated management platform server of the change. In one or more of the various embodiments, the management platform server may then broadcast updated policies that include rules for the new network address. Accordingly, in one or more of the various embodiments, an existing connection between gateway computer 416 and gateway computer 412 through relay 434 may continue once relay 434 receives an updated policy from management platform server 440.

It is also possible for a device, such as one of nodes 402, 404, 406, 408, or 410, to be moved to a different gateway computer. In this scenario, management platform server 440 has to be notified of the new configuration before the node is to work again properly. For example, if node 410 were moved from private network 420*b* to private network 420*a*, management platform server 440 could be informed, either manually or automatically, and then update relevant relays with new policies. Existing connections may time-out or reset automatically, when it is discovered that endpoint no longer exists at the network address the connection is directed towards. Once a connection has timed-out or reset, a new connection may be initiated and the connection between endpoints may continue uninterrupted.

Figure 5:
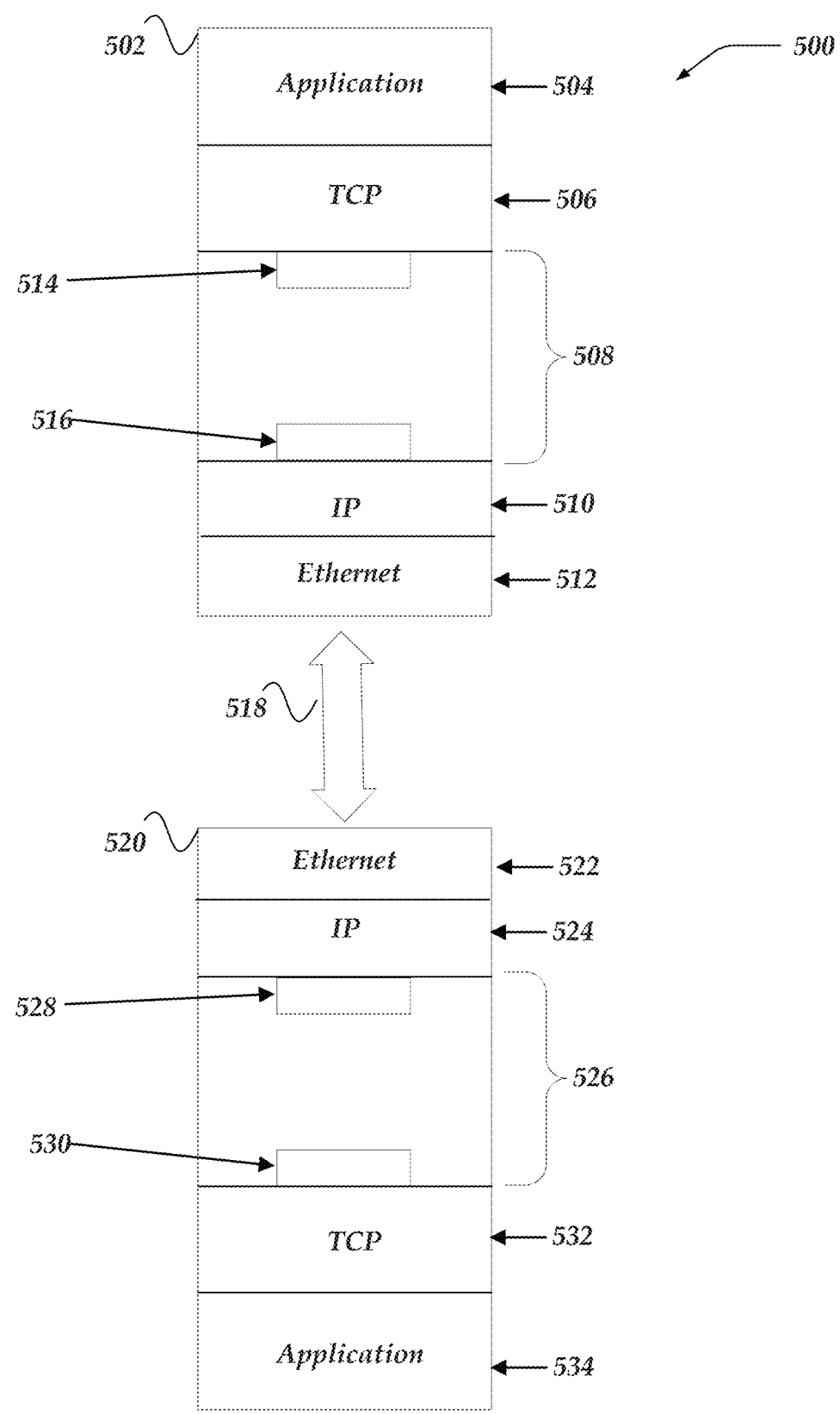
FIG. 5 illustrates a logical representation of a system for communicating in a network in accordance with at least one of the various embodiments.

FIG. 5 illustrates a logical representation of system 500 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 502 may be arranged such that an application layer, such as, application layer 504 may perform actions that include communication; next at layer 506, one or more standard network protocols APIs (TCP in this example) may be employed; at layer 508 one or more special actions may be performed to support the overlay networks. And, before the communication is sent out, the lower level layers, such as, layer 510 (IP layer in this example) or layer 512 (Ethernet later in this example) may be applied.

In at least one of the various embodiments, gateway computers may be arranged to substitute their GID for use as a network address by higher layers such as application layer 504 and TCP layer 506. The GID may be arranged to be compatible with the native data structures that may be used to represent actual network addresses. Accordingly, in at least one of the various embodiments, application level networking API's that accept network address data structures as parameters may be enabled to accept GID instead. For example, in some embodiments, an internet address may be represented using a 32-bit value. Thus, in such embodiments, the GID may be a 32-bit number, making it size compatible with an ordinary network address value of an underlay network.

In at least one of the various embodiments, at the gateway layer, layer 508 in FIG. 5, the GID of the source gateway or the target gateway are mapped to an actual network address. In at least one of the various embodiments, component 514 may represent components that are arranged to map GIDs to network addresses, and component 516 may represent components that are arranged to map from a network address to a GID.

In at least one of the various embodiments, since the GIDs may be mapped to an actual network addresses, network layers, such as IP layer 510 or Ethernet layer 512 may generate the appropriate network protocol information for the communication. Accordingly, in at least one of the various embodiments, network path 518 may be employed to communicate the communication network packets to its next destination.

In at least one of the various embodiments, communication 520 represents the received version of communication 502. The network protocol layers (Ethernet layer 522 or IP layer 522) may accept the communication over the network; gateway layer 526 employs component 528 and component 530 to map network addresses to GIDs; TCP layer 532 performs higher level network protocol actions using the GID in place of the network address; and application layer 534 employs the payload of the communication to perform application specific actions based on the actual contents of the payload.

In one or more of the various embodiments, network layers, such as, IP layer 510, Ethernet layer 512, Ethernet layer 522, or IP layer 524 may be associated with one or more network ports or one or more network links, hereinafter referred to as network ports or ports. In some embodiments, if there may be more than one port, gateway computers may be arranged to bridge one or more of the ports such that the bridged ports may be associated with the same network address information. Accordingly, in some embodiments, individual bridged ports may be associated with the same overlay policy because devices interacting with the bridged port may treat them as if they are same physical port even though there are more than physical connection (or more than one radio transceiver). Similarly, in some embodiments, if gateway computers have two or more ports that may be grouped into two or more port groups that may include one or more ports each.

Alternatively, in one or more of the various embodiments, one or more ports of a gateway computer with multiple ports may be individually assigned overlay policy or otherwise considered independently from each other. Accordingly, in some embodiments, gateway engines may be arranged to distinguish individual ports or port groups on gateway computers from each other as described in more detail below.

Figure 6:
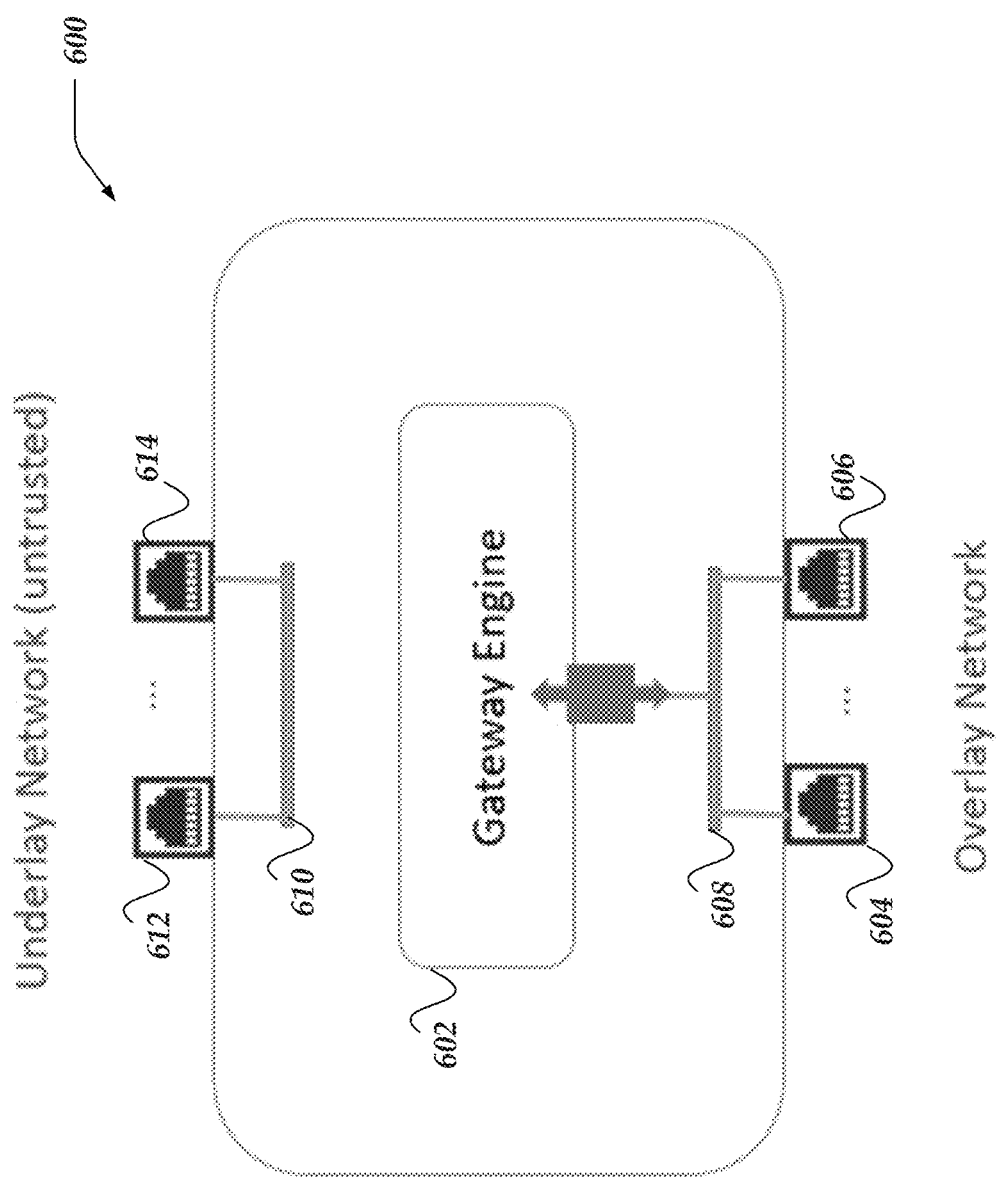
FIG. 6 illustrates a logical representation of a gateway computer for port level policy isolation in overlay networks in accordance with one or more of the various embodiments.

FIG. 6 illustrates a logical representation of gateway computer 600 for port level policy isolation in overlay networks in accordance with one or more of the various embodiments. In one or more of the various embodiments, gateway computer 600 may be arranged to include gateway engine 602, one or more ports, such as, port 604 through port 606 (representing m-number of ports), bridging layer 608, bridging layer 610, port 612 through port 614 (representing n-number of ports), or the like.

In this example, for some embodiments, port 604 through port 606 may be arranged to connect to a trusted network. Accordingly, in some embodiments, gateway engines may be arranged to enforce overlay policy on devices operating on the trusted network via their connection through the trusted-side ports.

Further, in this example, for some embodiments, port 612 through port 614 may be bridged ports that connect to the untrusted networks. These ports may be employed to connect to other gateway computers, gateway relay computers, or the like, that may be reachable via local-area networks or wide-area networks.

In one or more of the various embodiments, while bridged ports may enable higher throughput or an increased number of connections, the network management policy, including overlay policy may be required to be the same for all the ports that may be bridged together. Accordingly, conventionally, bridged ports may be considered logically to be a single port as far policy configuration may be considered.

Accordingly, in one or more of the various embodiments, traffic provided to gateway computer 600 over ports 604 through port 606 may be provided to gateway engine 602. In some embodiments, gateway engine may be arranged to treat the traffic from the different ports as having the same GID governed by the same overlay policy.

Figure 7:
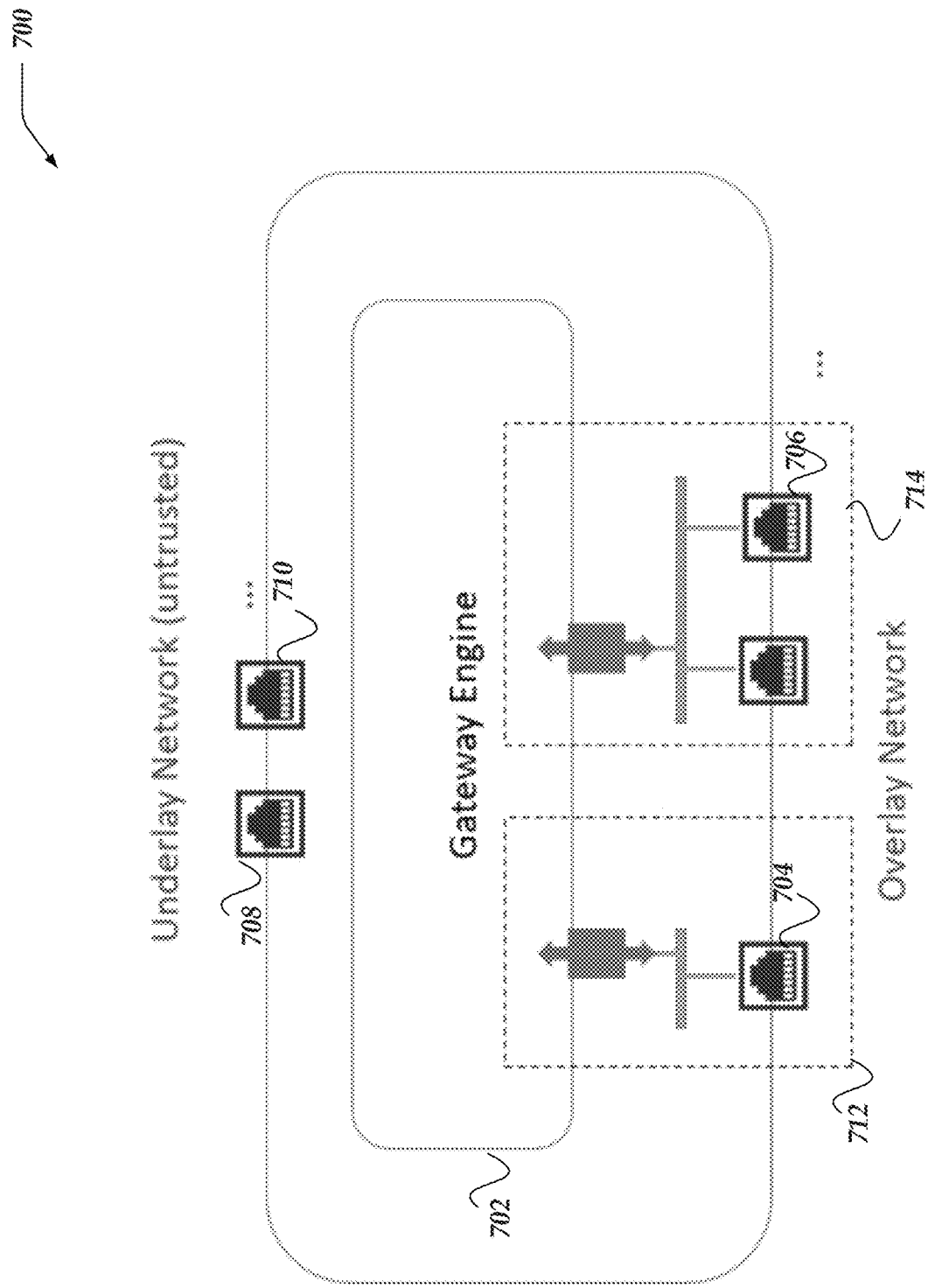
FIG. 7 illustrates a logical representation of a gateway computer for port level policy isolation in overlay networks in accordance with one or more of the various embodiments.

FIG. 7 illustrates a logical representation of gateway computer 700 for port level policy isolation in overlay networks in accordance with one or more of the various embodiments. In one or more of the various embodiments, gateway computer 700 may be arranged to include gateway engine 702, one or more ports, such as, port 704 through port 706 (representing m-number of ports), port 708 through port 710 (representing n-number of ports), or the like.

However, distinct from gateway computer 600 as described above, in some embodiments, gateway computer 700, includes one or more port groups, such as, port group 712, port group 714, or the like. In one or more of the various embodiments, gateway computer 700 may be arranged to apply different or independent overlay policies to separate port groups even though they may be comprised of different ports on the same gateway computer. Accordingly, in this example, gateway computers may be arranged to apply overlay policies to node computers connected to port 704 (in port group 712) that may be different than overlay policies applied to node computers connected to port 706, in port group 714. Note, in one or more of the various embodiments, port groups, such as, port group 714 may be configured to have more than one port. Accordingly, in some embodiments, gateway computers may be arranged to apply the same overlay policies to each port in the same port group.

Figure 8:
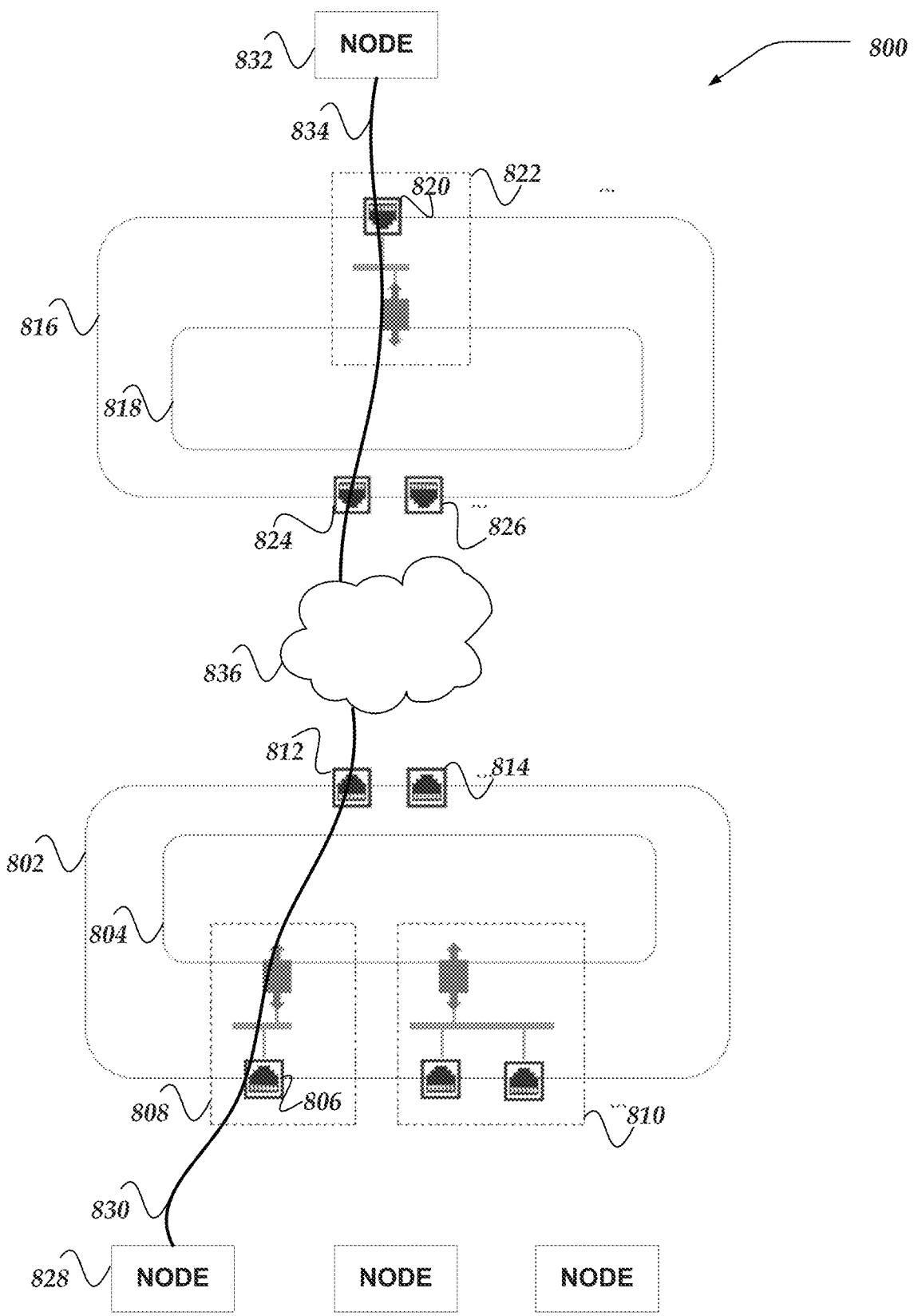
FIG. 8 illustrates a logical schematic of a system for port level policy isolation in overlay networks in accordance with one or more of the various embodiments.

FIG. 8 illustrates a logical schematic of system 800 for port level policy isolation in overlay networks in accordance with one or more of the various embodiments. In some embodiments, more than one gateway computer may be arranged to provide connectivity between one or more node computers in an overlay network and enforce overlay policies between or among them.

In one or more of the various embodiments, gateway computers, such as, gateway computer 802 may be arranged to include: one or more gateway engines, such as, gateway engine 804; one or more ports, such as, port 806, or the like; one or more port groups, such as, port group 808, port group 810, or the like; one or more ports, such as, port 812, port 814, or the like, that connect the gateway computer to a network, such as, network 836.

Also, in some embodiments, node computers coupled with a gateway computer, such as, gateway computer 802 may be enabled by another gateway computer, such as, gateway computer 816 to access one or more other node computers. Accordingly, in one or more of the various embodiments, gateway computer 816, may include: one or more gateway engines, such as, gateway engine 818; one or more ports, such as, port 820, or the like; one or more port groups, such as, port group 822, or the like; one or more other ports, such as, port 824, port 826, or the like.

In this example, node computer 828 may be trying to connect with node computer 832 over an overlay network enforced by gateway computer 802 and gateway computer 804. Accordingly, in this example, for some embodiments, node computer 828 may be arranged to connect to port 806 via network link 830. Accordingly, in one or more of the various embodiments, gateway engine 804 may be arranged to identify that port 806 may be associated with port group 808. Thus, in some embodiments, gateway engine 804 may apply overlay policy that may be associated with port group 808 to the communication sent by node 828.

Accordingly, in one or more of the various embodiments, if the overlay policies enforced for node computer 828 and node computer 832 enable node computer 828 to send the communication to node computer 832, gateway computer 804 may be arranged to route the network traffic associated with the communication through a port, such as, port 812, over network 836 to port 824 of gateway computer 816.

In one or more of the various embodiments, the network traffic associated with node computer 828 may be provided to gateway engine 818. In some embodiments, gateway engine 818 may be arranged to determine that the network traffic may be associated the communication from node computer 828. Accordingly, in this example, gateway engine 818 may route the network traffic to port group 822 because relevant overlay policy may indicate that port group 822 may be coupled with node computer 832 via port 820 in this example. Finally, in this example, the network traffic associated with the communication from node computer 828 may be provided to node computer 832 over network link 834.

Figure 9:
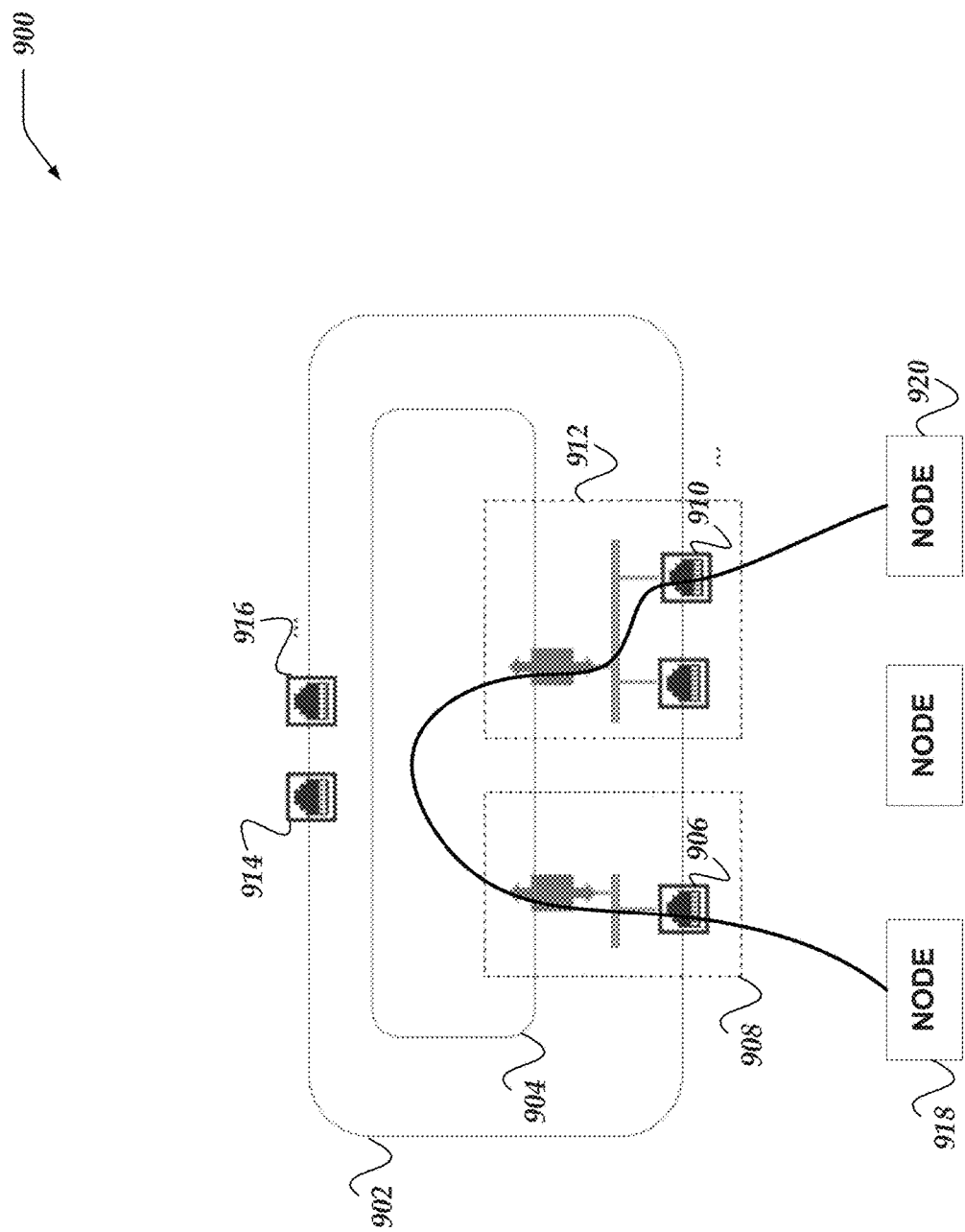
FIG. 9 illustrates a logical schematic of a system for port level policy isolation in overlay networks in accordance with one or more of the various embodiments.

FIG. 9 illustrates a logical schematic of system 900 for port level policy isolation in overlay networks in accordance with one or more of the various embodiments. In some embodiments, one or more node computers may be coupled to ports in different port groups of the same gateway computer.

In one or more of the various embodiments, even though the different node computers may be connecting to the same gateway computer, because they may connected using separate port groups, overlay policies may be enforced on different node computers connected to the same gateway computer as well as with node computers connected to other gateway computers in the overlay network. In this example, for some embodiments, gateway computer 902 may include, gateway engine 904, port 906, port group 908, port 910, port group 912, port 914, port 916, or the like.

In this example, node computer 918 may be arranged to communicate with node computer 920. Accordingly, in this example, for some embodiments, node computer 918 may send network traffic directed to node computer 920 to port 906 in port group 908. Accordingly, in this example, gateway engine 904 may be arranged determine if overlay policies enable the communication from node computer 918 to be delivered to node computer 920. In some embodiments, gateway engine 904 may determine that node computer 920 may be managed by gateway computer 902 just as node computer 918. In some embodiments, assuming the overlay policies enable the communication, gateway engine 904 may route the network traffic associated with node computer 918 to port 910 in port group 912 to reach node computer 920.

Accordingly, in some embodiments, if a node computer directs communication to another node computer that may be managed by the same gateway computer, the associated network traffic may be routed between ports and port groups on the same gateway computer.

Generalized Operations

FIGS. 10-14 represent the generalized operation of multi-link network gateways with monitoring and dynamic failover in accordance with at least one of the various embodiments. In at least one of the various embodiments, processes 1000, 1100, 1200, 1300, and 1400 described in conjunction with FIGS. 10-14 may be implemented by or executed on one or more processors of a relay computer, a gateway computer, or a management platform server, such as network computer 300 of FIG. 3. In other embodiments, these processes, or portions thereof, may be implemented by or executed on one or more processors of a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 10-14 may be used for multi-link network gateways with monitoring and dynamic failover in accordance with at least one of the various embodiments or architectures such as those described in conjunction with FIGS. 4-9. Further, in at least one of the various embodiments, some or all of the action performed by processes 1000, 1100, 1200, 1300, and 1400 may be executed in part by overlay network engine 322, management platform engine 324, monitoring engine 326, gateway engine 327, or the like, or combination thereof.

Figure 10:
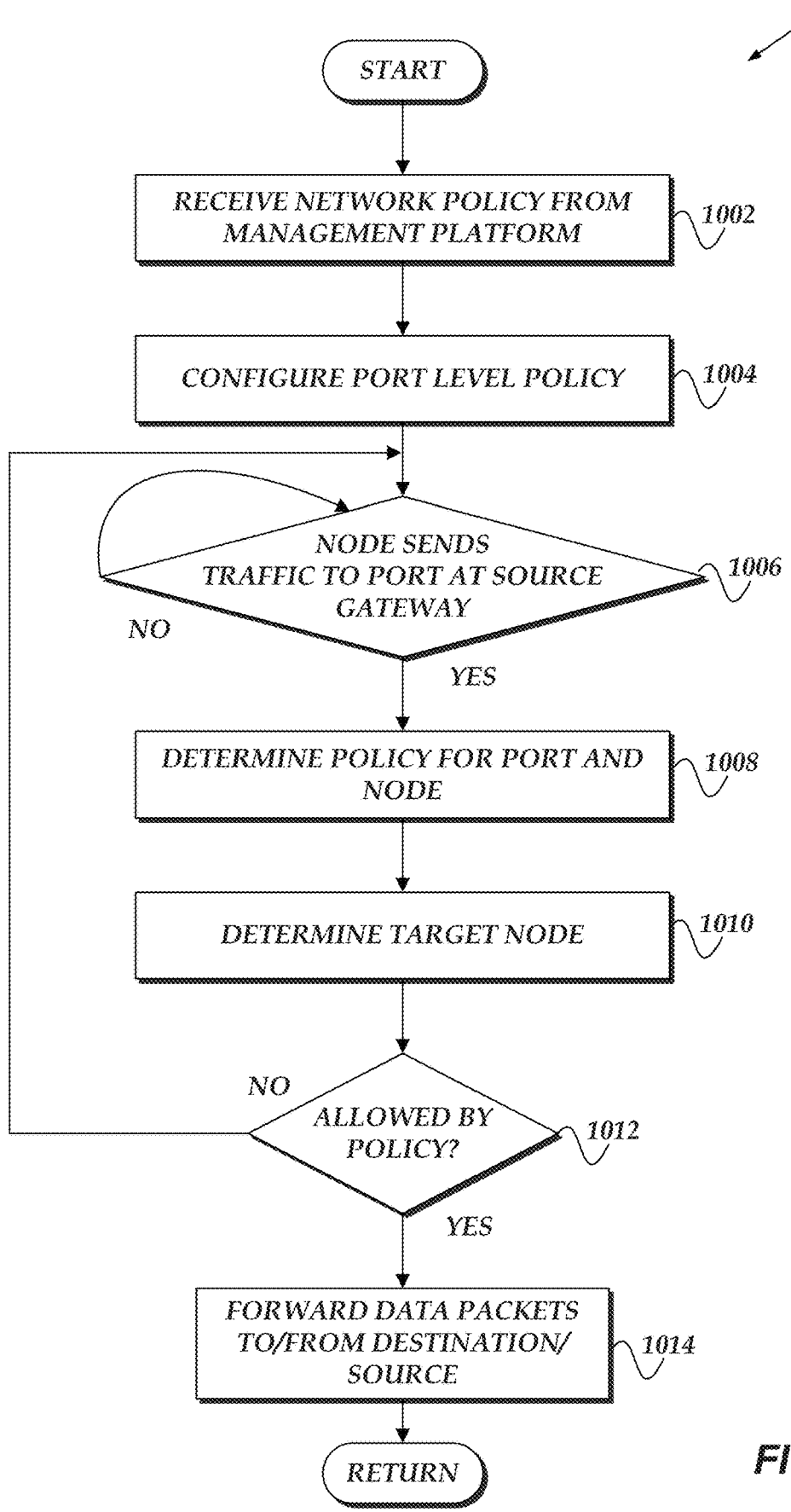
FIG. 10 illustrates an overview flowchart of a process for port level policy isolation in overlay networks in accordance with one or more of the various embodiments.

FIG. 10 illustrates an overview flowchart of process 1000 for port level policy isolation in overlay networks in accordance with one or more of the various embodiments. After a start block, at block 1002, in one or more of the various embodiments, gateway computers may be arranged to receive network policy information from a management platform engine. As described above, management platform engines continuously provide network policy information that provides the definition of the overlay networks as well as the rules defining which nodes can see each other, or otherwise communicate.

At block 1004, in one or more of the various embodiments, the gateway computer may be arranged to configure port level policy based on the network policy information provided by the management platform engine.

At decision block 1006, in one or more of the various embodiments, if a node provides network traffic directed to another node associated with a port group, control may flow to block 1008; otherwise, control may loop back to decision block 1006.

At block 1008, in one or more of the various embodiments, the gateway computer may be arranged to determine the policy associated with the target node or its associated port group.

At block 1010, in one or more of the various embodiments, the gateway computer may be arranged to determine the identity or network address information associated with the target node or the associated port groups.

At decision block 1012, in one or more of the various embodiments, if the communication is allowed by the overlay network policy, control may flow to block 1014; otherwise, control may loop back to decision block 1006.

At block 1014, in one or more of the various embodiments, the gateway computer may be arranged to forward network traffic to/from destination/source nodes. In some embodiments, if the overlay policy is satisfied, the overlay network may facilitate the exchange of network traffic between the source node and the target node.

Next, in one or more of the various embodiments, control may be returned to a calling process.

Figure 11:
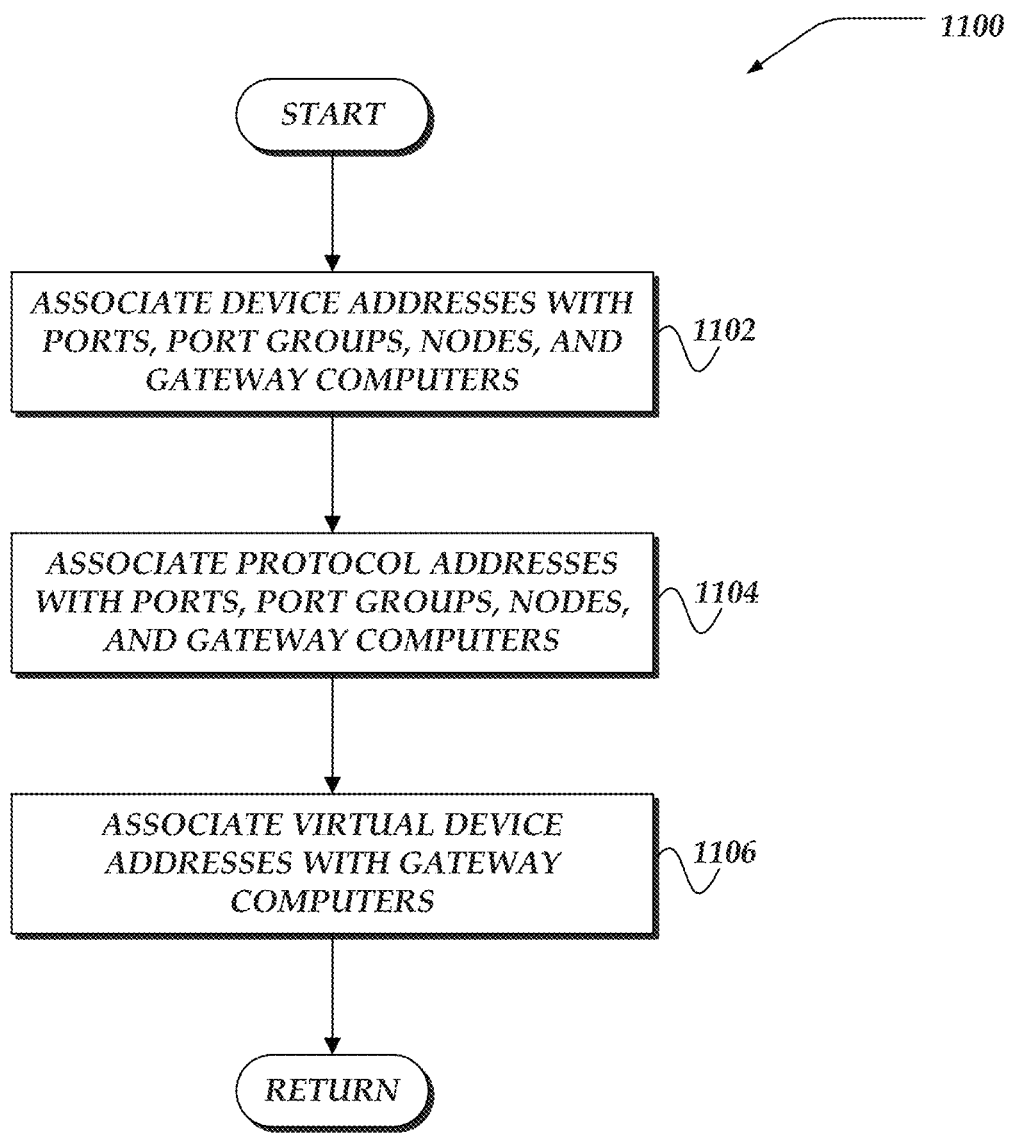
FIG. 11 illustrates a flowchart of a process that configures one or more portions of the network address information for port level policy isolation in overlay networks in accordance with one or more of the various embodiments.

FIG. 11 illustrates a flowchart for process 1100 that configures one or more portions of the network address information for port level policy isolation in overlay networks in accordance with one or more of the various embodiments. After a start block, at block 1102, in one or more of the various embodiments, a management platform engine may be arranged to associate device addresses one or more ports, port groups, nodes, gateway computers, or the like. In one or more of the various embodiments, management platform engines may be arranged to support various networking protocols or technologies. Often network communication comprises two or more protocols with lower level protocols wrapping or including higher level protocols.

In one or more of the various embodiments, nodes, endpoints, device, computers, or the like, on a network may be associated with network addresses (address information) that may be compatible or supported by some or all of the layered protocols. In some cases, an network address used by one protocol may be unknown or otherwise opaque to other protocols.

In one or more of the various embodiments, device addresses described here may be considered to be a low level network address. Devices addresses may be employed to send network traffic from one device to another. Typically, device addresses may be employed by low level protocols to send traffic to devices on the network. Accordingly, low level protocols may be limited to exchanging traffic between devices that are on the same physical network segment. Conventionally, higher level protocols may be employed to manage communicating traffic that may traverse more than one network segment or network device.

In some embodiments, some network devices will employ interfaces that are associated with a device address provided by its manufacturer. Accordingly, low level protocols may employ the manufacturer provided device address directly. For example, network protocols, such as, Bluetooth, WIFI, Ethernet, or the like, may employ Media Access Control (MAC) addresses as device addresses to identify devices, interfaces, or endpoints in a network.

In one or more of the various embodiments, management platform engine may be arranged to map one or more device addresses to one or more devices, interfaces, ports, port groups, or the like. In some embodiments, the manufacturer provided device addresses may be employed. In some circumstances, network devices, including, management platform engines may be arranged to provide virtualized/virtual device address that may be associated with one or more manufacturer provided device addresses.

At block 1104, in one or more of the various embodiments, the management platform engine may be arranged to associate protocol addresses with ports, ports groups, nodes, gateway computers, or the like. In some embodiments, network devices, nodes, gateway computers, endpoints, or the like, may be associated with network addresses that may have their format, definition, behaviors, or the like, defined as part of higher level protocol. Note, in this sense, a higher level protocol may be considered a protocol that is considered to be a higher level as compared to protocols that define the device addresses. As such as, protocol addresses may provide logical abstractions of device address. For example, Internet Protocol (IP) addresses (IPv4 or IPv6) may be considered protocol addresses because they conform to the IP protocol.

In some embodiments, management platform engine may be arranged to employ rules, setting, groupings, or the like, provided via configuration information to account for local circumstances or local requirements.

At block 1106, in one or more of the various embodiments, the management platform engine may be arranged to associate virtual device addresses with one or more gateway computers. In some embodiments, virtual device addresses may conform to format or semantic requirements that may be associated with device addresses. Thus, in one or more of the various embodiments, network devices or applications may be expected to treat virtual device addresses the same or similar to conventional device addresses. In some embodiments, a virtual device address associated with a gateway computer may be based on a protocol address that may be associated the gateway computer.

Next, in one or more of the various embodiments, control may be returned to a calling process.

Figure 12:
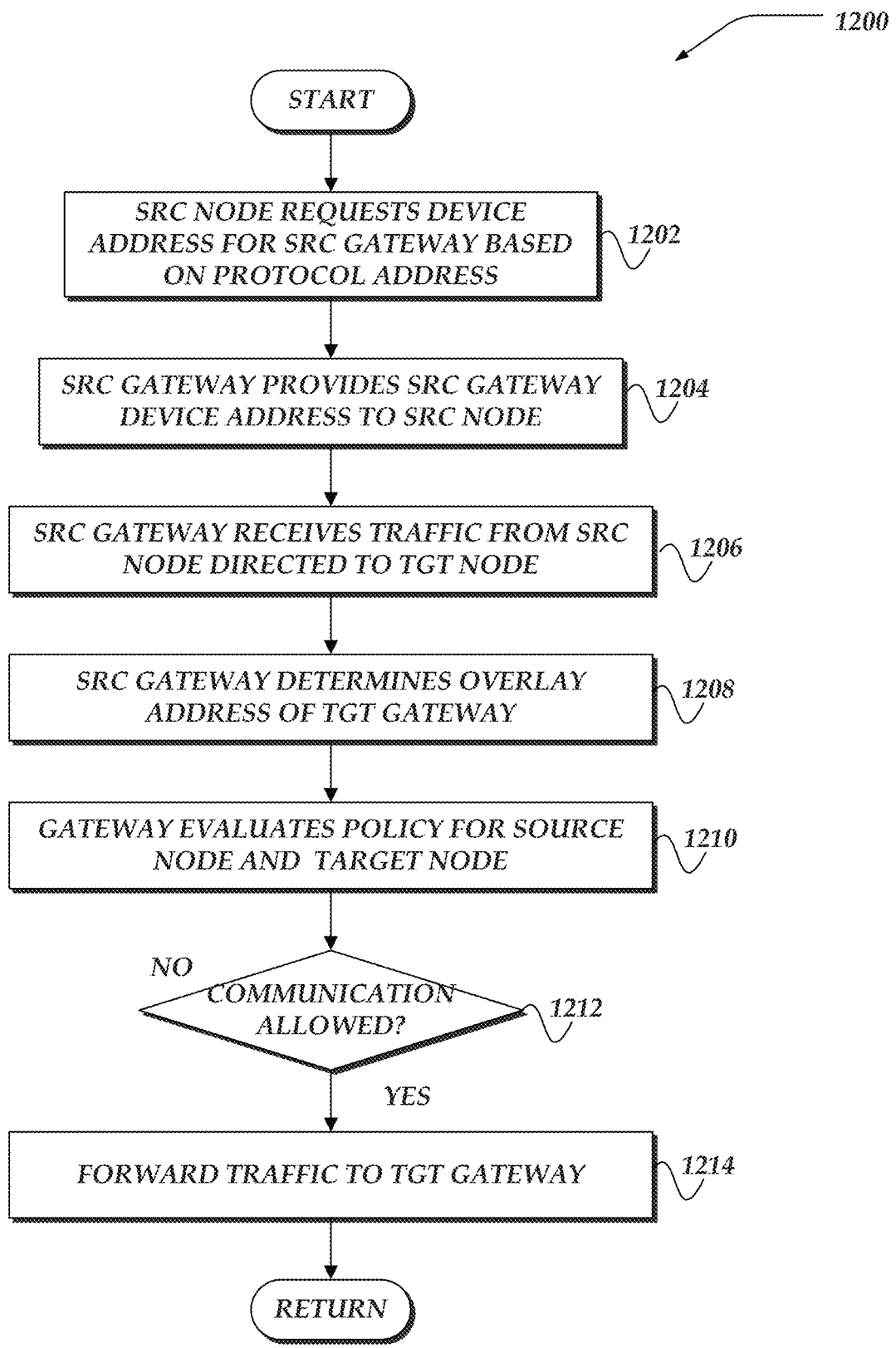
FIG. 12 illustrates a flowchart of a process for port level policy isolation in overlay networks for communication that includes nodes that may be associated with different gateway computers.

FIG. 12 illustrates a flowchart for process 1200 for port level policy isolation in overlay networks for communication that includes nodes that may be associated with different gateway computers. After a start block, at block 1200, in one or more of the various embodiments, a source node may be arranged to request a device address for its gateway computer based on the protocol address associated with its gateway computer. This gateway computer may be referred to as the source gateway computer.

In one or more of the various embodiments, as described above, nodes may be arranged to send or receive network traffic to other nodes via an assigned gateway computer. Typically, nodes may be arranged to have knowledge of a one or more protocol addresses associated with their gateway computer. Thus, in some embodiments, nodes may be arranged to provide a request to a network service (or the gateway computer directly) for the device address associated with their gateway computer. Here, for clarity and brevity, the gateway computer associated with a node sending a request or sending traffic to a node associated with a different gateway computer may be referred to as the source gateway computer. Similarly, the gateway computer associated with the target node may be referred to as the target gateway computer. In some embodiments, if nodes are using different ports or ports on the same gateway computer, the source gateway computer and target gateway computer may be the same gateway computer.

In some embodiments, nodes may be arranged to maintain local cache memory that store device addresses for a defined period of time. Thus, in some cases, the source node may retrieve the device address of the source gateway computer from a local cache rather than making an explicit network request.

At block 1204, in one or more of the various embodiments, the source gateway computer may be arranged to provide the device address associated with the source gateway computer to the target node. In some embodiments, the device address requested by the source node may be provided by an address resolution service that may be separate from the source gateway computer. In some cases, the source gateway computer may provide the address resolution service.

Accordingly, the protocol address provided by the node request may be employed lookup a corresponding device address.

At block 1206, in one or more of the various embodiments, the source gateway computer may be arranged to receive traffic from the source node that may be directed to the target node. In some embodiments, the source node may employ the device address of the source gateway computer to send network traffic to the source gateway computer.

Accordingly, in some embodiments, the device address of the source gateway computer may be employed by lower level (data-link level) protocols to communicate network traffic to the source gateway computer. For example, the device address of the source computer may be used as the sender address and the device address of the source gateway computer may be used as the destination address.

At block 1208, in one or more of the various embodiments, the source gateway computer may be arranged to determine the overlay address of the target gateway computer associated with the target node. In some embodiments, overlay addresses may be protocol addresses associated with gateway computers. In some embodiments, there may be more than protocol addresses associated with a gateway computer. For example, some protocol addresses may be associated with the underlay network while other protocol addresses may be associated with the overlay network or overlay network protocols.

Accordingly, in one or more of the various embodiments, gateway computers may be arranged to employ policy information provided by one or more management platform engines to determine protocol addresses for the gateway computer that may be associated with the target node. As described above, management platform engines may generate and circulate policy information to gateway computers associated with overlay networks. This policy information includes the protocol addresses associated with nodes, gateway computers, or the like, that comprise that overlay network.

At block 1210, in one or more of the various embodiments, the source gateway computer may be arranged to evaluate policy associated with the source node and the target node to determine if the traffic may be allowed. In one or more of the various embodiments, the policy information provided by management platform engines may be employed to determine if the source node can send the network traffic to the target node.

At decision block 1212, in one or more of the various embodiments, if the communication may be allowed, control may flow to block 1214; otherwise, control may be returned to a calling process. In some embodiments, gateway computers may arranged to discard network traffic that violates or otherwise does not conform to the policies provided by management platform engines. In some embodiments, gateway computers may be arranged to perform one or more actions, such as, logging some or all of the information associated with invalid or disallowed network traffic, raising alarms, or the like, as may be defined in configuration information to account for local circumstances or local requirements.

At block 1214, in one or more of the various embodiments, the source gateway computer may be arranged to forward the traffic from the source node to the target gateway computer. See, FIG. 13 and the description of process 1300.

Next, in one or more of the various embodiments, control may be returned to a calling process.

Figure 13:
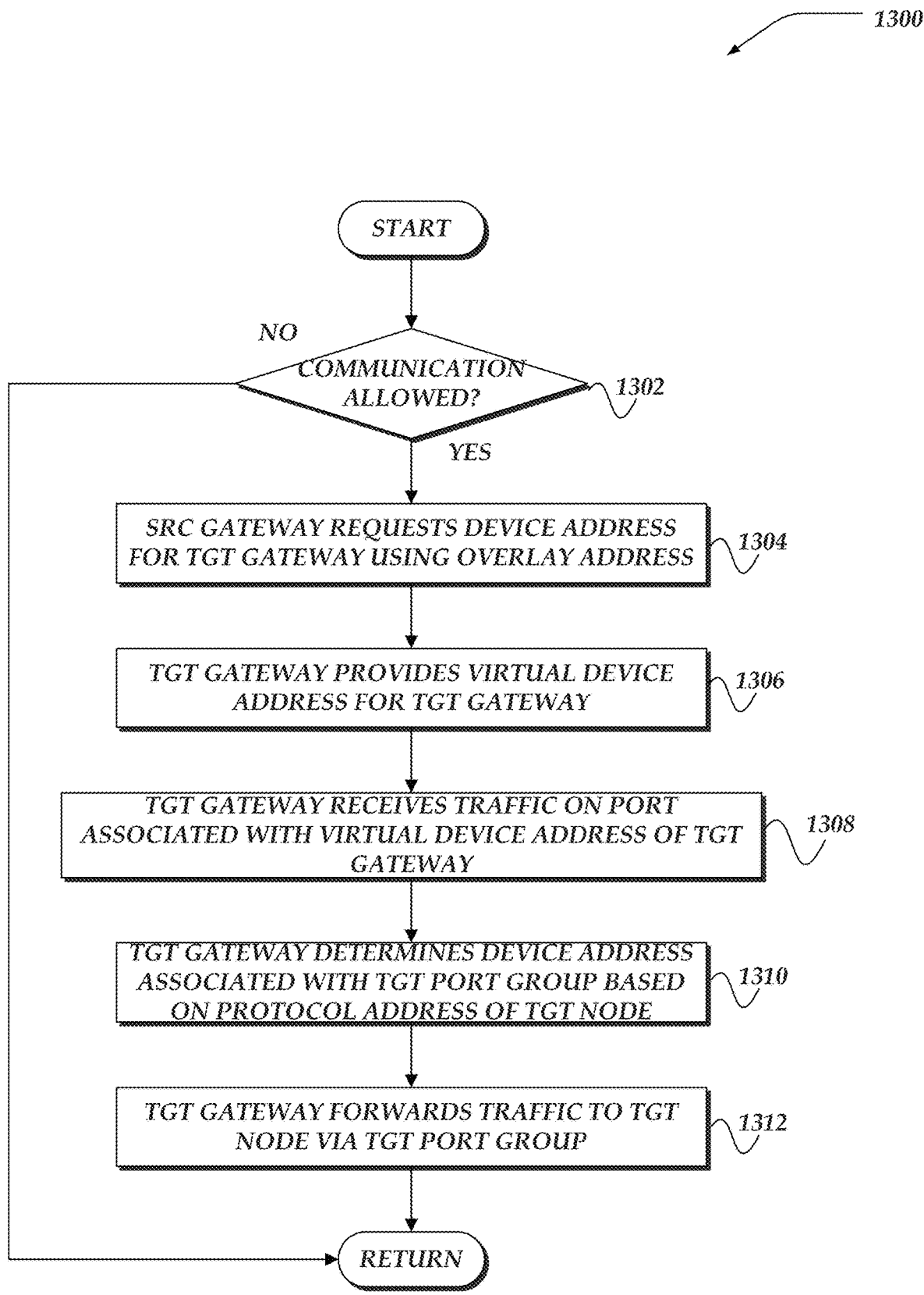
FIG. 13 illustrates a flowchart of a process for port level policy isolation in overlay networks in accordance with one or more of the various embodiments.

FIG. 13 illustrates a flowchart of process 1300 for port level policy isolation in overlay networks in accordance with one or more of the various embodiments. After a start block, decision at block 1302, in one or more of the various embodiments, if a communication to the target node or target gateway computer may be allowed under the current policy, control may flow to block 1304; otherwise, control may be returned to a calling process.

As described above, the source gateway computer associated with the source node may have previously evaluated the network traffic to determine if the network traffic is allowed by the current overlay network policies. Also, in some embodiments, one or more features, such as, encryption, tunneling, authentication, or the like, may be provided by overlay engines or gateway engines running on gateway computers, nodes, or management platform engines may be provided as part of an overlay network implementation.

At block 1304, in one or more of the various embodiments, the source gateway computer may be arranged to request a device address for the target gateway computer based on the overlay address associated with the target gateway computer. In one or more of the various embodiments, gateway computers in an overlay network may be associated overlay addresses. In some embodiments, overlay addresses may be protocol addresses that may be employed to identify individual gateway computers in the overlay network. Accordingly, in one or more of the various embodiments, lower level protocols that communicate network traffic from one device to another on the physical network may require device addresses because they do not recognize or understand higher level protocol addresses.

Accordingly, in one or more of the various embodiments, the source gateway computer may be arranged to employ an address resolution service or lookup service to determine a device address associated with the target gateway computer. However, in some embodiments, rather than providing a manufacturer provided device address of a network interface on the target gateway computer, the target gateway computer may be arranged to generate or provide a virtual device address that may be based on an overlay address associated with the target gateway computer.

In some embodiments, the virtual device address may be arranged to conform to the format or semantics of an underlying lower level protocol. In some embodiments, gateway computers may be arranged to generate virtual device addresses. However, in some cases, gateway computers may be arranged to employ a virtual device address that may be generated or provided by a management platform engine.

At block 1306, in one or more of the various embodiments, the target gateway computer may be arranged to provide a virtual device address that may be associated with the target gateway computer. As mentioned above, the virtual device address of the target gateway computer may be provided by an address resolution service, the target gateway computer, or a management platform engine. In some embodiments, the virtual device address resolution protocol.

In one or more of the various embodiments, the virtual device address associated with the target gateway computers may be based on a protocol address or overlay address that may be employed to associate policy with the gateway computer. Accordingly, gateway computers may be arranged to generate the virtual device address by employing a mapping function that produces (virtual) device addresses that conform to the lower network protocols used to communicate network traffic on the underlay network. For example, if the underlay network employs IP over Ethernet, the virtual device address may be arranged to conform to the rules or semantics of MAC addresses.

At block 1308, in one or more of the various embodiments, the target gateway computer may be arranged to receive network traffic via a port that may be associated with the virtual device address of the target gateway computer. As described above, gateway computers may be arranged to include one or more ports or port groups that may be associated with one or more nodes. Also, in some embodiments, gateway computers may be arranged to include one or more ports or port groups that may be configured to communicate with other gateway computers, management platform engines, relay computers, other network computers, or the like.

Accordingly, network traffic from the target gateway computer may be provided to a port or port groups on the target gateway computer. These ports or port groups may be separate from the ports used to communication with nodes that may be associated with the target gateway computer.

At block 1310, in one or more of the various embodiments, the target gateway computer may be arranged to determine the device address for the port or port group associated with the target node based on the protocol address of the target node. Network traffic directed to the target node may include the protocol address associated with the target node. Accordingly, the target gateway computer may be arranged to employ a local cache or address resolution service to determine the device address of the node based on the protocol address.

In one or more of the various embodiments, the device address associated with the target port or port groups may be looked up using the protocol address of the target node. In some embodiments, the target gateway computer may employ one or more of local policy information (e.g., tables that map node protocol addresses to port groups or port group device addresses) or an address resolution service.

At block 1312, in one or more of the various embodiments, the target gateway computer may be arranged to forward the network traffic to the target node via the determined port or port group. Accordingly, in some embodiments, the target gateway computer may be arranged to forward the network traffic sent by the source node to the target node via the determined port group. In some embodiments, the network traffic may include the target node's device address.

Next, in one or more of the various embodiments, control may be returned to a calling process.

Figure 14:
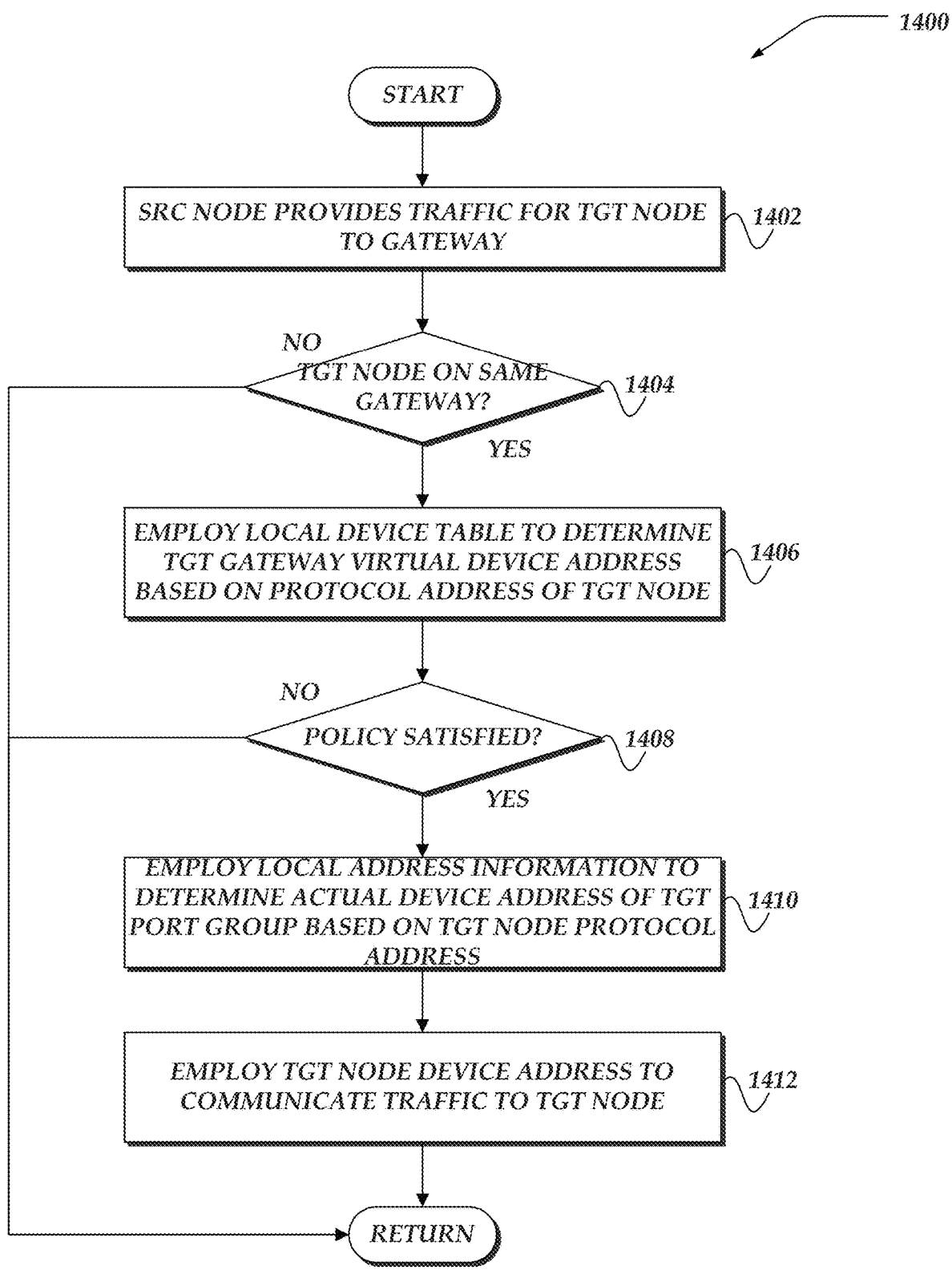
FIG. 14 illustrates a flowchart of a process for port level policy isolation in overlay networks if the source and target ports or port groups may be on the same gateway computer in accordance with one or more of the various embodiments.

FIG. 14 illustrates a flowchart for process 1400 for port level policy isolation in overlay networks if the source and target ports or port groups may be on the same gateway computer in accordance with one or more of the various embodiments. After a start block, at block 1402, a source node may provide traffic that may be directed to a target node. As described above, applications or services that may be running on a node may initiate communications with another node or computer on the overlay network. As described above, applications running on node computers may be configured request or access network communications services provided by the overlay network. In some embodiments, such services may be unaware that they may be using an overlay network. For example, an application running on a node computer may employ conventional network service APIs or protocols absent awareness that the network traffic is being routed or tunneled to its destination via the overlay network.

Accordingly, network traffic from the source node may be provided to its gateway computer even though it is directed to another node computer.

At decision block 1404, in one or more of the various embodiments, if the target node may be associated with the same gateway computer as the source node, control may flow block 1406; otherwise, control may be returned to a calling process.

In one or more of the various embodiments, policy information distributed by the management platform engines managing the overlay network may include tables or lists of the node computers associated with the gateway computer. Accordingly, gateway computers may be arranged to evaluate the destination protocol address associated with outbound network traffic to determine if the target of the network traffic may be associated with another port groups.

At block 1406, in one or more of the various embodiments, locally configured address information may be employed to determine a virtual device address for the gateway computer based on the protocol address associated with the target node. In some embodiments, gateway computers may be arranged to recognize that the protocol address associated with the target node is associated with a local port group. For example, in some embodiments, policy information may include tables (or other data structures) that list the protocol addresses of the local port groups. Accordingly, if a target node is associated with a local port, the gateway computer may be arranged to provide its virtual device address to the source node for use as a target device address to communicate the network traffic from the source node to the gateway computer.

Note, as described above, the virtual device address of the gateway computer may be based on the overlay address (overlay network protocol address) of the gateway computer.

At decision block 1408, in one or more of the various embodiments, if the communication satisfies the policy of the overlay network, control may flow to block 1418; otherwise, control may be returned to a calling process. As described above, gateway computers may be arranged to enforce the policies of the overlay network based on the policy information that may be distributed by its management platform engines.

At block 1410, in one or more of the various embodiments, the local address information may be employed to determine the actual device address of the port or port groups associated with the target node based on the protocol address of the target node.

In some embodiments, if the gateway computer determines that the target node is on a local port group, the gateway computer may be arranged to determine the device address associated with the local port group based on address information stored locally. For example, locally stored policy information may include a table that associates protocol addresses of the local port groups with device addresses. The gateway computer may use that information to determine the device address for the local port group that may be associated with the target node.

At block 1412, in one or more of the various embodiments, the gateway computer may be arranged to employ the device address associated with the target port or target port groups to provide the traffic to the target node.

Accordingly, in one or more of the various embodiments, the gateway computer may be arranged to modify the network traffic, replacing the virtual device address of the gateway computer with the actual device address of the local port group associated with the target node.

Thus, in one or more of the various embodiments, the underlying device/data protocols may be employed to communicate the network traffic to the target node.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing communication over one or more networks using one or more network computers, wherein execution of instructions by the one or more network computers perform the method comprising:
    providing an underlay network that communicatively couples a source gateway and a target gateway using one or more underlay protocols, wherein the target gateway includes two or more port groups that are each associated with a separate target node;
    providing an overlay network on the underlay network based on policy information, wherein the source gateway and the target gateway are each assigned separate gateway identifiers (GIDs) that are associated with the overlay network; and
    in response to the source gateway authorizing a source node to employ the overlay network to communicate one or more encrypted payloads to a target node, performing further actions, including:
        providing a virtual device address for the target gateway to the source gateway, wherein the virtual device address is based on the GID assigned to the target gateway, and wherein the virtual device address is employed as a device address of the target gateway on the underlay network;
        employing the underlay network and the virtual device address to communicate network traffic from the source node to the target gateway, wherein the network traffic includes a protocol address of the target node and the one or more encrypted payloads;
        determining a device address of a port group on the target gateway associated with the target node based on the protocol address of the target node and the policy information; and
        employing the device address of the port group to provide the one or more encrypted payloads to the target node, wherein each encrypted payload is decrypted by the target node.

2. The method of claim 1, wherein providing the overlay network, further comprises:
    enabling encrypted payloads to be exchanged between one or more source nodes associated with the source gateway and the two or more target nodes using an overlay protocol that is separate from the one or more underlay protocols.

3. The method of claim 1, further comprising:
    providing the policy information to the target gateway and the source gateway;
    determining one or more access rules that enable the source node to provide network traffic to the target node over the overlay network based on the policy information; and
    associating the target node with the port group on the target gateway.

4. The method of claim 1, wherein providing the virtual device address for the target gateway, further comprises:
    employing the underlay network to request a device address of the target gateway based on a protocol address that corresponds to the target gateway, wherein the protocol address of the target gateway is based on the GID assigned to the target gateway;
    determining the virtual device address of the target gateway based on the protocol address associated with the target gateway; and
    employing the one or more underlay protocols to communicate the virtual device address to the source gateway.

5. The method of claim 1, further comprising:
    employing the underlay network to provide a device address of the source gateway to the source node; and
    employing the underlay network and the device address of the source gateway to communicate the one or more encrypted packets to the source gateway.

6. The method of claim 1, further comprising:
    employing the underlay network to communicate one or more other encrypted packets from the source node to another target node, wherein the other target node is associated with another port group on the source gateway, wherein the other port group is separate from a port group associated with the source node;
    determining another device address of the other port group based on another protocol address associated with the other target node; and
    employing the underlay network and the other device address of the other port group to communicate the one or more other encrypted packets from the source gateway to the other target via the other port group.

7. A system for managing communication over one or more networks, comprising:
    one or more gateway computers, comprising:
    a transceiver that communicates over the network;
    a memory that stores at least instructions; and
    one or more processors that execute instructions that perform actions, including:
        providing an underlay network that communicatively couples a source gateway and a target gateway using one or more underlay protocols, wherein the target gateway includes two or more port groups that are each associated with a separate target node;
        providing an overlay network on the underlay network based on policy information, wherein the source gateway and the target gateway are each assigned separate gateway identifiers (GIDs) that are associated with the overlay network; and
        in response to the source gateway authorizing a source node to employ the overlay network to communicate one or more encrypted payloads to a target node, performing further actions, including:
        providing a virtual device address for the target gateway to the source gateway, wherein the virtual device address is based on the GID assigned to the target gateway, and wherein the virtual device address is employed as a device address of the target gateway on the underlay network;

employing the underlay network and the virtual device address to communicate network traffic from the source node to the target gateway, wherein the network traffic includes a protocol address of the target node and the one or more encrypted payloads;

determining a device address of a port group on the target gateway associated with the target node based on the protocol address of the target node and the policy information; and employing the device address of the port group to provide the one or more encrypted payloads to the target node, wherein each encrypted payload is decrypted by the target node; and one or more node computers, comprising:
a transceiver that communicates over the network;
a memory that stores at least instructions; and
one or more processors that execute instructions that perform actions, including: providing a portion of the one or more encrypted payloads.

8. The system of claim 7, wherein providing the overlay network, further comprises:
enabling encrypted payloads to be exchanged between one or more source nodes associated with the source gateway and the two or more target nodes using an overlay protocol that is separate from the one or more underlay protocols.

9. The system of claim 7, further comprising:
providing the policy information to the target gateway and the source gateway;
determining one or more access rules that enable the source node to provide network traffic to the target node over the overlay network based on the policy information; and
associating the target node with the port group on the target gateway.

10. The system of claim 7, wherein providing the virtual device address for the target gateway, further comprises:
employing the underlay network to request a device address of the target gateway based on a protocol address that corresponds to the target gateway, wherein the protocol address of the target gateway is based on the GID assigned to the target gateway;
determining the virtual device address of the target gateway based on the protocol address associated with the target gateway; and
employing the one or more underlay protocols to communicate the virtual device address to the source gateway.

11. The system of claim 7, further comprising:
employing the underlay network to provide a device address of the source gateway to the source node; and
employing the underlay network and the device address of the source gateway to communicate the one or more encrypted packets to the source gateway.

12. The system of claim 7, further comprising:
employing the underlay network to communicate one or more other encrypted packets from the source node to another target node, wherein the other target node is associated with another port group on the source gateway, wherein the other port group is separate from a port group associated with the source node;
determining another device address of the other port group based on another protocol address associated with the other target node; and
employing the underlay network and the other device address of the other port group to communicate the one or more other encrypted packets from the source gateway to the other target via the other port group.

13. A processor readable non-transitory storage media that includes instructions for managing communication over one or more networks, wherein execution of the instructions by the one or more network computers perform the method comprising:
providing an underlay network that communicatively couples a source gateway and a target gateway using one or more underlay protocols, wherein the target gateway includes two or more port groups that are each associated with a separate target node;
providing an overlay network on the underlay network based on policy information, wherein the source gateway and the target gateway are each assigned separate gateway identifiers (GIDs) that are associated with the overlay network; and
in response to the source gateway authorizing a source node to employ the overlay network to communicate one or more encrypted payloads to a target node, performing further actions, including:
providing a virtual device address for the target gateway to the source gateway, wherein the virtual device address is based on the GID assigned to the target gateway, and wherein the virtual device address is employed as a device address of the target gateway on the underlay network;
employing the underlay network and the virtual device address to communicate network traffic from the source node to the target gateway, wherein the network traffic includes a protocol address of the target node and the one or more encrypted payloads;
determining a device address of a port group on the target gateway associated with the target node based on the protocol address of the target node and the policy information; and
employing the device address of the port group to provide the one or more encrypted payloads to the target node, wherein each encrypted payload is decrypted by the target node.

14. The media of claim 13, wherein providing the overlay network, further comprises:
enabling encrypted payloads to be exchanged between one or more source nodes associated with the source gateway and the two or more target nodes using an overlay protocol that is separate from the one or more underlay protocols.

15. The media of claim 13, further comprising:
providing the policy information to the target gateway and the source gateway;
determining one or more access rules that enable the source node to provide network traffic to the target node over the overlay network based on the policy information; and
associating the target node with the port group on the target gateway.

16. The media of claim 13, wherein providing the virtual device address for the target gateway, further comprises:
employing the underlay network to request a device address of the target gateway based on a protocol address that corresponds to the target gateway, wherein the protocol address of the target gateway is based on the GID assigned to the target gateway;
determining the virtual device address of the target gateway based on the protocol address associated with the target gateway; and employing the one or more underlay protocols to communicate the virtual device address to the source gateway.

17. The media of claim 13, further comprising:
employing the underlay network to provide a device address of the source gateway to the source node; and
employing the underlay network and the device address of the source gateway to communicate the one or more encrypted packets to the source gateway.

18. The media of claim 13, further comprising:
employing the underlay network to communicate one or more other encrypted packets from the source node to another target node, wherein the other target node is associated with another port group on the source gateway, wherein the other port group is separate from a port group associated with the source node;
determining another device address of the other port group based on another protocol address associated with the other target node; and
employing the underlay network and the other device address of the other port group to communicate the one or more other encrypted packets from the source gateway to the other target via the other port group.

19. A network computer for managing communication over one or more networks, comprising:
a transceiver that communicates over the network;
a memory that stores at least instructions; and
one or more processors that execute instructions that perform actions, including:
providing an underlay network that communicatively couples a source gateway and a target gateway using one or more underlay protocols, wherein the target gateway includes two or more port groups that are each associated with a separate target node;
providing an overlay network on the underlay network based on policy information, wherein the source gateway and the target gateway are each assigned separate gateway identifiers (GIDs) that are associated with the overlay network; and
in response to the source gateway authorizing a source node to employ the overlay network to communicate one or more encrypted payloads to a target node, performing further actions, including:
providing a virtual device address for the target gateway to the source gateway, wherein the virtual device address is based on the GID assigned to the target gateway, and wherein the virtual device address is employed as a device address of the target gateway on the underlay network;
employing the underlay network and the virtual device address to communicate network traffic from the source node to the target gateway, wherein the network traffic includes a protocol address of the target node and the one or more encrypted payloads;
determining a device address of a port group on the target gateway associated with the target node based on the protocol address of the target node and the policy information; and employing the device address of the port group to provide the one or more encrypted payloads to the target node, wherein each encrypted payload is decrypted by the target node.

20. The network computer of claim 19:
wherein providing the overlay network, further comprises, enabling encrypted payloads to be exchanged between one or more source nodes associated with the source gateway and the two or more target nodes using an overlay protocol that is separate from the one or more underlay protocols.

21. The network computer of claim 19, further comprising:
providing the policy information to the target gateway and the source gateway;
determining one or more access rules that enable the source node to provide network traffic to the target node over the overlay network based on the policy information; and
associating the target node with the port group on the target gateway.

22. The network computer of claim 19, wherein providing the virtual device address for the target gateway, further comprises:
employing the underlay network to request a device address of the target gateway based on a protocol address that corresponds to the target gateway, wherein the protocol address of the target gateway is based on the GID assigned to the target gateway;
determining the virtual device address of the target gateway based on the protocol address associated with the target gateway; and
employing the one or more underlay protocols to communicate the virtual device address to the source gateway.

23. The network computer of claim 19, further comprising:
employing the underlay network to provide a device address of the source gateway to the source node; and
employing the underlay network and the device address of the source gateway to communicate the one or more encrypted packets to the source gateway.

24. The network computer of claim 19, further comprising:
employing the underlay network to communicate one or more other encrypted packets from the source node to another target node, wherein the other target node is associated with another port group on the source gateway, wherein the other port group is separate from a port group associated with the source node;
determining another device address of the other port group based on another protocol address associated with the other target node; and
employing the underlay network and the other device address of the other port group to communicate the one or more other encrypted packets from the source gateway to the other target via the other port group.

* * * * *